United States Patent
Itou et al.

(10) Patent No.: US 7,259,817 B2
(45) Date of Patent: Aug. 21, 2007

(54) LIQUID CRYSTAL DISPLAY DEVICE AND PARTIAL TRANSMISSION TYPE LIQUID CRYSTAL DISPLAY DEVICE

(75) Inventors: Osamu Itou, Ibaraki (JP); Hiroko Hayata, Chiba (JP); Kouichi Anno, Chiba (JP); Shinichi Komura, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 10/485,078

(22) PCT Filed: Aug. 2, 2002

(86) PCT No.: PCT/JP02/07907

§ 371 (c)(1),
(2), (4) Date: Jul. 27, 2004

(87) PCT Pub. No.: WO03/016990

PCT Pub. Date: Feb. 27, 2003

(65) Prior Publication Data

US 2004/0263729 A1   Dec. 30, 2004

(30) Foreign Application Priority Data

Aug. 8, 2001 (JP) .............................. 2001-240056

(51) Int. Cl.
*G02F 1/1335* (2006.01)

(52) U.S. Cl. ...................... 349/117; 349/114; 349/118; 349/119; 349/179; 349/180; 349/181

(58) Field of Classification Search ........ 349/179–181, 349/117–119, 114
See application file for complete search history.

(56) References Cited

U.S. PATENT DOCUMENTS 5,587,821 A  12/1996  Nakanishi et al.
6,281,952 B1  8/2001  Okamoto et al.
6,524,666 B1*  2/2003  Ichinose et al. ............. 428/1.3

FOREIGN PATENT DOCUMENTS

| JP | 07-191313 | 7/1995 |
| JP | 11-242226 | 9/1999 |
| JP | 2001-042128 | 2/2001 |
| JP | 2001-42128 | 2/2001 |

* cited by examiner

*Primary Examiner*—David Nelms
*Assistant Examiner*—Thanh-Nhan P. Nguyen
(74) *Attorney, Agent, or Firm*—Hogan & Hartson LLP

(57) ABSTRACT

The present invention is configured so that it has a first substrate, a second substrate, a liquid crystal layer pinched between the first substrate and second substrate, and a driving unit, wherein a characteristic of a reflectivity versus an applied voltage is a normally closed type and a characteristic of a transmissivity versus an applied voltage is the normally closed type: wherein the first substrate has a common electrode, and an upside polarization plate and upside phase plate on an upper surface; wherein the second substrate has a reflective electrode and transparent electrode connected with an active element, and a downside polarization plate and downside phase plate on a lower surface; wherein the liquid crystal layer has a twist angle not less than 40 degrees and not more than 65 degrees; wherein a retardation of the liquid crystal layer in a reflective display unit is within a range of not less than 230 nm and not more than 300 nm; and wherein a retardation of the liquid crystal layer in a transmissive display unit is larger than the retardation of the liquid crystal layer in the reflective display unit. Thus, is obtained a display that is more luminous and wider in a light reproduction range under a wide range of luminous environments ranging from a dark place to direct sunlight.

6 Claims, 15 Drawing Sheets

35 : Concavity and Convexity Formed Layer

Liquid Crystal Thickness in Transmissive Display Unit / Liquid Crystal Thickness in Reflective Display Unit

LIQUID CRYSTAL DISPLAY DEVICE AND PARTIAL TRANSMISSION TYPE LIQUID CRYSTAL DISPLAY DEVICE

FIELD OF THE INVENTION

An applicable field where the present invention belongs is a liquid crystal display device, and in particular, a liquid crystal display device showing a higher contrast ratio under a wide range of light environments from a dark room to direct sunlight.

BACKGROUND OF THE INVENTION

A reflective liquid crystal display device performs a display reflecting incident lights from surroundings using a light reflector. Since the display liquid crystal display device is constant in a contrast ratio regardless of luminosity of the surroundings, it shows a favorable display under comparatively light environments from direct sunlight to a room inside. Since a transmissive liquid crystal display device performs a display making a backlight light as a light source, it shows a favorable display under comparatively dark environments from direct sunlight to a room inside. Since a transflective liquid crystal display device equipped with both of a reflective electrode and transparent electrode within one pixel and equipped with a backlight light source, it shows a favorable display under a wide range of environments from direct sunlight to a room inside.

The transflective liquid crystal display device is configured to house a light reflector on an inner surface of a liquid crystal cell and stack one polarization plate and one or two phase plates at an upside and downside of the liquid crystal cell. Focusing attention on a reflective display unit since the unit uses only one polarization plate, the configuration is called a single polarization plate display system. Since the system performs a display utilizing a change of phase differences of a liquid crystal layer, it has characteristics that a contrast ratio is excellent and a driving voltage is low.

In addition, in order to improve luminosity and obtain a higher quality display like paper by disposing of a mirror surface reflection, light scattering means are used. In the light scattering means there exist a light scattering plate having a concavity and convexity on a reflection surface, a diffusive adhesion consisting of not less than two kinds of transparent media with a different refractivity, and the like. Since the light scattering means have an effect of broadening light propagating directions, they can obtain a luminous reflective display even when an observer and light source, macroscopically seen, are not in a relation of positions for a display plane which satisfies a positive reflection condition.

In the single polarization plate display system there exist a normally closed type that performs a dark display in no voltage application and a luminous display in a voltage application; and a normally open type that performs the luminous display in no voltage application and the dark display in the voltage application. Most of conventional transflective liquid crystal display devices are the normally open type.

DISCLOSURE OF THE INVENTION

A contrast ratio of a single polarization plate display system is decided according to optical parameters of a liquid crystal layer, upside/downside phase plates, and upside/downside polarization plates. In the optical parameters of the liquid crystal layer there exist a twist angle, tilt angle, and retardation. In the optical parameters of the phase plates there exist a delay phase axis azimuthal angle, retardation, and Nz coefficient. In the optical parameter of the polarization plates there exists an absorption axis azimuthal angle.

Naming a light path in a case of performing a reflective display with a single polarization plate display mode a reflection light path, lights takes a following process in the reflection light path. That is, the lights enter a polarization plate, pass a phase plate and liquid crystal layer, and are reflected by a reflector; and they again pass the liquid crystal layer and phase plate, and enter the polarization plate. If lights are given phase differences equivalent to one half of wavelengths in the reflection light path, they are absolutely absorbed at a time of their entering the polarization plate at the second time, thereby an ideal dark display being realized. That is, it is because at this time a vibration plane of the lights which have become a linear polarization at the first time pass of the polarization plate rotates by 90 degrees in the reflection light path and a vibration direction becomes parallel to an absorption axis of the polarization plate at the time of their entering the polarization plate at the second time. If converting the above to one way of the reflection light path, that is, to a process where lights enter the polarization plate, pass the phase plate and liquid crystal layer, and reach the reflector, phase differences given to transmissive lights are ¼ wave lengths, which are one half of the ½ wavelengths. Ideally a polarization state of the transmissive lights becomes a circular polarization at a time of their reaching the reflector.

Focusing attention on lights passing in a normal line direction, set the optical parameters of the liquid crystal layer, phase plate, and polarization plate so that the polarization conversion described above is realized at all areas of visible wavelengths.

A reflective liquid crystal display device prevents surrounding sights from being reflected in and a mirror surface from being reflected, using light diffusion means such as a diffusion adhesive, and increases a reflectivity effectively utilizing outside lights.

As a result, lights emitted in the normal line direction also result in including lights that are entered from a wide range of visual angles inclusive of oblique directions. Therefore, in light paths distributing in the wide range of visual angles, the phase differences given to transmissive lights must be made ¼ wave lengths on one way. But in the conventional single polarization plate display mode a visual angle dependability of the phase differences is not reduced, so the phase differences given to the transmissive lights are largely deviated from ¼ wavelengths in the oblique directions.

A first problem which the present invention solves is to substantially make phase differences of a normal line direction ¼ wavelengths in a wide range of the visible wavelengths, to reduce phase difference variations due to variations of visual angles, and thereby to obtain a higher contrast ratio.

Most of the conventional transflective liquid crystal display devices are the normally open type and perform the dark display in a voltage application when a retardation of a liquid crystal layer is sufficiently reduced and becomes a neat value of 0 nm. In this state in order to reduce reflectivity of the reflective display, a combination between an upside phase plate and upside polarization plate must be made to have optical characteristics near a ¼ wavelength plate with substantially a broad band. On the other hand, although the luminous display is performed in no voltage application when the retardation of the liquid crystal layer is large, it is difficult, in combining this with the upside phase plate and upside polarization plate of the optical characteristics near the ¼ wavelength plate, to make both of the reflective display and transmissive display color free. Particularly, if coloration of the luminous display of the transmissive display is tried to be eliminated, a transmissivity must be reduced, so in the transmissive display a sufficient transmissivity cannot be obtained A second problem which the invention solves is to also realize a higher transmissivity in the reflective display with maintaining a higher reflectivity.

One of embodiments of the invention is a liquid crystal display device which has a first substrate, second substrate, liquid crystal layer pinched between the first substrate and second substrate, and driving unit; wherein characteristics of a reflectivity versus an applied voltage are a normally closed type, and those of a transmissivity versus an applied voltage are a normally closed type; wherein the first substrate has a common electrode, and an upside polarization plate and upside phase plate on an upper surface; wherein the second substrate has a reflective electrode and transparent electrode connected with an active element, and an downside polarization plate and downside phase plate on a lower surface; wherein the liquid crystal layer has a twist angle of not less than 40 degrees and not more than 65 degrees, the retardation of the liquid crystal layer in a reflective display unit is within a range of not less than 230 nm and not more than 300 nm, and the retardation of the liquid crystal layer in a transmissive display unit is larger than that of the liquid crystal layer in the reflective display unit.

One of the embodiments of the invention is as follows: Although a contrast ratio is shown as a ratio of reflectivities in a luminous display and dark display, it is a reflectivity in the dark display to mainly influence the contrast ratio. Since the reflective display utilizes lights entered from oblique directions reflecting in a normal direction by using a light diffusion means, the reflectivity in the dark display is influenced not only by a reflectivity in the normal line direction but also by a visual angle dependability of the reflectivity. Since between the normally closed type and normally open type orientation states of liquid crystal layers in dark displays are different, the visual angle dependability of reflectivities is also different in both. Evaluating the visual angle dependability of the reflectivities by replacing it with visual angle characteristics of phase differences, the visual angle characteristics of the phase differences are minimum in no voltage application. Accordingly, if the dark display is made in no voltage application, a dark display reflectivity is hard to increase even when lights are entered from the oblique directions, whereby it is led that a higher contrast ratio is obtained regardless of a light incident state. The invention achieves to make the reflective display become a higher contrast ratio by adopting the normally closed type performing the dark display in no voltage application of which visual angle characteristics of the phase differences are small.

A configuration of a liquid crystal display device where a single polarization plate display system is applied is designed to be a structure stacked, in order from a user side, with a polarization plate, phase plate, liquid crystal layer, and reflector. Optical characteristics of a normal line direction of the liquid crystal layer in no voltage application are described at pages 201 to 211 in a document of Mol. Cryst. Liq. Crystby Volume 24 (1973) by S. Chandrasekar, G. S. Ranganath, U. D. Kini, K. A. Suresh, et al., and by using this a polarization state of lights passing through a liquid crystal layer in no voltage application can be obtained. If in a case of performing a dark display with a reflective display, a polarization state of lights reaching a reflector passing through a polarization plate, phase plate, liquid crystal layer is a circular polarization, it is ideal. Focusing attention on a process through which the lights reflected with the reflector then and assuming that the polarization state of the lights entering the liquid crystal layer is the circular polarization, after their passing through the liquid crystal layer, calculate the polarization state of transmissive lights. Moreover, so as to convert these to a linear polarization in a wide range of the visible wavelengths, obtain a retardation of the phase plate and an azimuthal angle of a delay phase axis. Obtaining a vibration direction of polarized lights (linear polarization or elliptical polarization near this) after the phase plate being passed and making the polarized lights and an absorption axis become parallel, define the azimuthal angle of an absorption axis of the polarization plate.

Also in the liquid crystal layer there exist optical parameters such as a twist angle and retardation influencing display characteristics. Although in the reflective display a luminous white display like paper is requested, in a case of a single polarization plate type the luminosity of the reflective display is restricted by a light absorption of the polarization plate. In order to realize a reflective display which a user feels sufficiently white, it is requested to exactly make the reflective display an achromatic color. If the twist angle of the liquid crystal layer is optimized, the reflective display of the achromatic color can be obtained across a wider range of retardation values of the liquid crystal layer. Although in a case of using a diffusion plate the liquid crystal layer varies according to its concavity and convexity and the retardation values also vary, even in such the case the reflective display of the achromatic color can be obtained if the twist angle is optimized.

In FIG. 21 is shown a calculation result of a relationship between Δnd of the liquid crystal layer giving an achromatic color display and the twist angle. Broken lines in FIG. 21 are a result for a case that the dark display and luminous display are performed by a driving voltage being sufficiently heightened between a state where the liquid crystal layer absolutely orients an orientation direction in an electric field direction (homeotropic orientation) and no voltage application state. In a twist angle of 0 degree the Δnd of the liquid crystal layer giving the achromatic color display is two points, a ¼ wavelength and ¾ wavelength. With an increase of the twist angle the former value of the two points increases, the latter one decreases, and both match in a vicinity of a twist angle of 70 degrees. In the vicinity of the twist angle of 70 degrees linearly distributes the Δnd of the liquid crystal layer giving the achromatic color display and it turns out that the reflective display of the liquid crystal layer is kept the achromatic color even if the retardation value of the liquid crystal layer varies. In addition, the twist angle is common in both of the normally closed type and normally open type.

The invention focuses attention on a case using a state that an orientation direction of the liquid crystal layer is not absolutely oriented in an electric field direction by more lowering a driving voltage for reducing consumption power. A calculation result of a relationship between the Δnd of the liquid crystal layer giving the achromatic color and the twist angle is included in FIG. 21 when driving voltages in one of the display states are made 5V, 4V, and 3V.

In this case it turns out that the twist angle giving an achromatic color reflective display becomes a lower value than 70 degrees even if the retardation value of the liquid crystal layer varies.

Since the invention performs an active matrix drive by a thin film transistor and the like, the optical parameters of the liquid crystal layer is comparatively freely selectable. Here, the twist angle in a vicinity of 50 degrees where a color free luminous display is easy to be obtained is selected when driven with comparatively a low voltage of some 3 V.

The invention reduces the reflectivity of the dark display across a wider range of visual angles according to following guide lines and improves the contrast ratio of the reflective display. In addition to an adoption of a normally closed display, the invention optimizes a combination between the phase plate and liquid crystal layer, thereby further reducing a deviation from a ¼ length wavelength of phase differences in visual directions. An Nz coefficient representing a three dimensional distribution of a refractivity of a one-axial medium is defined in a presentation by Yasuo Fujimura, Tatsuki Nagatsuka, Hiroyuki Yoshimi, Takefumi Shimomura, et al. (at pages 739 to 742, SID '91 DIGEST (1991)) by a following equation:

$$Nz=(nx-nz)/(nx-ny), \quad (\text{eq. 1})$$

where nx and ny are refractivities; nx is the refractivity of a delay phase axis direction; ny is that of a proceeding phase axis direction; and nz is that of a thickness direction.

The liquid crystal layer of the single polarization plate display mode is in many cases a twist orientation, and if the liquid crystal layer is made the normally closed type, it is the twist orientation in the dark display. Since the twist angle of the liquid crystal layer is not more than 90 degrees and small, its optical characteristics are close to a one-axial medium with an Nz coefficient of 1.0. It is in FIG. 13 that a disposition of a refractivity elliptical body in a state where the liquid crystal layer is combined with a phase plate with an Nz coefficient of 0.0 is shown. The liquid crystal layer of which refractivity elliptical body is long in a rotation-symmetry axial direction is a positive one-axial anisotropy and a shape like a rugby ball; whereas on the contrary the phase plate of which refractivity elliptical body is short in the rotation-symmetry axial direction is a negative one-axial anisotropy and a shape like a convex lens. Since the shapes of both the refractivity elliptical bodies are different, phase differences are favorably compensated even in a visual direction where the refractivity of a thickness direction contributes.

Moreover, assuming that the liquid crystal layer is the one-axial medium of an Nz coefficient of 1.0, dispose it so that the delay phase axis of the phase plate and the orientation direction of the liquid crystal layer are orthogonalized seen from a normal line direction. It is in FIG. 12 that the disposition of both the refractivity elliptical bodies in this state is shown. The direction of the delay phase axis of the one-axial medium in the visual direction is decided by a geometric operation as follows: In a vertical plane for a noticed visual direction, make a section including the center of a refractivity elliptical body. At this time the section is elliptical and the long axis direction of the ellipse is the delay phase axis direction in the noticed visual direction. As being clear if the operation is added to respective refractivity elliptical bodies shown in FIG. 12 when the phase plate and liquid crystal layer are one-axial media of the Nz coefficients of 1.0 and 0.0, respectively, and a stacked layer body of which delay phase axes are orthognalized, the delay phase axes of the phase plate and liquid crystal layer are orthogonalized in all visual directions. Therefore, if the phase difference of the stacked layer body of the phase plate and liquid crystal layer is set a ¼ wavelength in the normal line direction, a deviation from the ¼ wavelength of the phase difference of the stacked layer body is kept small even if light passing directions deviate from the normal line direction. Since in all visual directions the phase difference becomes close to the ¼ wavelength, the reflectivity can be favorably reduced in all visual directions.

Meanwhile, double refraction values of the phase plate and liquid crystal material depend on wavelengths. Since in these measurements a helium-neon laser with a wavelength of 633 nm is mostly used, define the double refraction value as a value in the wavelength of 633 nm. Also as for a retardation defined by a product of a thickness and double refraction, define it as a value in the wavelength of 633 nm.

Although the normally open type performs the dark display in a voltage application, the retardation of the liquid crystal layer at this time is an extremely small value. To begin with, decide a combination of the upside phase plate and upside polarization plate to reduce the reflectivity of the reflective display in the voltage application. In order to make the reflective display the dark display, the phase difference of the stacked layer body of the liquid crystal layer and phase plate must be made a ¼ wavelength. Since in the normally open type the retardation of the liquid crystal layer is extremely small in the dark display, that of the upside phase plate must be made a value close to the ¼ wavelength.

Next, combined with the upside phase plate, decide the retardation of the downside phase plate so as to make the transmissive display the dark display in a voltage application. Since a condition is that the retardation of the upside phase plate is approximately the ¼ wavelength and that of the liquid crystal layer is an extremely small value, the retardation of the downside phase plate essentially becomes a value close to the ¼ wavelength, too.

When both the retardations of the upside phase plate and downside phase plate are made the ¼ wavelength, the range of the retardations of the liquid crystal layer that make the luminous display of the transmissive display the achromatic color is restricted. In the single polarization plate type its transmissivity is restricted by a light absorption of the polarization plate and a transmissivity becomes not more than 45%. If in the normally open type the retardation of the liquid crystal layer is selected so as to make the luminous display of the transmissive display the achromatic color, the transmissivity does not reach 45% that is an upper limit value in a range of twist angles from 50 to 70 degrees giving a reflective luminous display of the achromatic color.

The normally closed type performs the dark display in no voltage application when the retardation of the liquid crystal layer becomes a maximum value. Since the retardation of the liquid crystal layer can be comparatively freely set, in the retardation value of the upside phase plate combined with it, there does not exist a restriction like the normally open type. For example, a combination of the upside phase plate and upside polarization plate reducing the reflectivity of the reflective display in no voltage application can make a consisting angle of the phase plate delay phase axis and polarization plate absorption axis a small angle not more than some 1.5 degrees. In this case a polarization state of lights transmitting the upside phase plate becomes an elliptical polarization that is large in an ellipticity regardless of their wavelengths (close to a linear polarization) and is characterized in that a wavelength dependability of a transmissive polarization is small. The luminous display is performed in a voltage application and the retardation of the liquid crystal layer at this time is a small value. Therefore, a conversion of a polarization state which the liquid crystal layer gives to transmissive lights is also small and the lights reach the downside phase plate and downside polarization plate with holding the above characteristic that the lights are small in the wavelength dependability of the polarization. As a result, the transmissivity approximately becomes constant regardless of the wavelengths and the transmissive lights become color free. Thus, the normally closed type performs the luminous display in a voltage application when the retardation of the liquid crystal layer is small, and a polarization generated with the combination of the upside phase plate and upside polarization plate is also small in the wavelength dependability, thereby the normally closed type being able to easily realize a color free transmissive luminous display.

Moreover, by optimizing a thickness of the liquid crystal layer of the transmissive display unit, the transmissivity can be increased till a value close to its upper limit value. Also at this time, from the reason described above, the transmissive luminous display is almost color free. Thus, the normally closed type can realize the color free transmisive display with a higher transmissivity. In addition, it can also simultaneously make the reflective display color free with a higher reflectivity.

In the transflective liquid crystal display device, a calculation result of the twist angle dependability of the transmissivity of the transmissive display is shown in FIG. 22. In FIG. 22, decide each parameter of the transflective liquid crystal display device as follows: To begin with, decide the optical parameters of the upside polarization plate and upside phase plate so that the reflective display becomes the achromatic color, maximum in luminosity, and maximum in contrast. Next, decide the optical parameters of the downside polarization plate and downside phase plate so that a contrast of the transimissive display becomes maximum, and decide the thickness of the liquid crystal layer of the transmissive display unit so that the transmissivity becomes maximum. The transmissivities of the normally closed type and normally open type are nearly equal at a twist angle of 0 degree and are values close to an upper limit value decided by the light absorption of the polarization plate. The transmissivity of the normally closed type is almost constant even if its twist angle increases, whereas that of the normally open type shows a tendency to decrease with an increase of its twist angle. In a range of twist angles of 50 to 70 degrees giving the reflective display of the achromatic color, the transmissivity of the normally closed type is from 1.5 to over 2.5-fold than that of the normally open type. Thus, in a condition giving an achromatic color reflective display, it is one of advantages of the normally closed type for the normally open type that the transmissivity of the transmissive display is higher and its value is closer to the upper limit value.

One of embodiments of the invention is a partial liquid crystal display device which has a first substrate, second substrate, and liquid crystal layer pinched between the first substrate and second substrate; and as display units, has a reflective display unit reflecting lights entered from the first substrate being an upper surface, and a transmissive display unit transmitting lights entered from the second substrate being a lower surface; wherein characteristics of a reflectivity versus an applied voltage are a normally closed type and those of a transmissivity versus an applied voltage are also a normally closed type; wherein the first substrate has a common electrode, and an upside polarization plate and upside phase plate on an upper surface; wherein the second substrate has a reflective electrode and transparent electrode, and an downside polarization plate and downside phase plate on a lower surface; wherein the liquid crystal layer has a twist angle of not less than 40 degrees and not more than 65 degrees, a retardation of the liquid crystal layer in the reflective display unit is within a range of not less than 230 nm and not more than 300 nm, and a retardation of the liquid crystal layer in the transmissive display unit is larger than that of the liquid crystal layer in the reflective display unit.

DESCRIPTION OF THE MOST PREFERRED EMBODIMENTS

Embodiments of the present invention will be described in more detail, using concrete examples.

Embodiment 1

Figure 1:
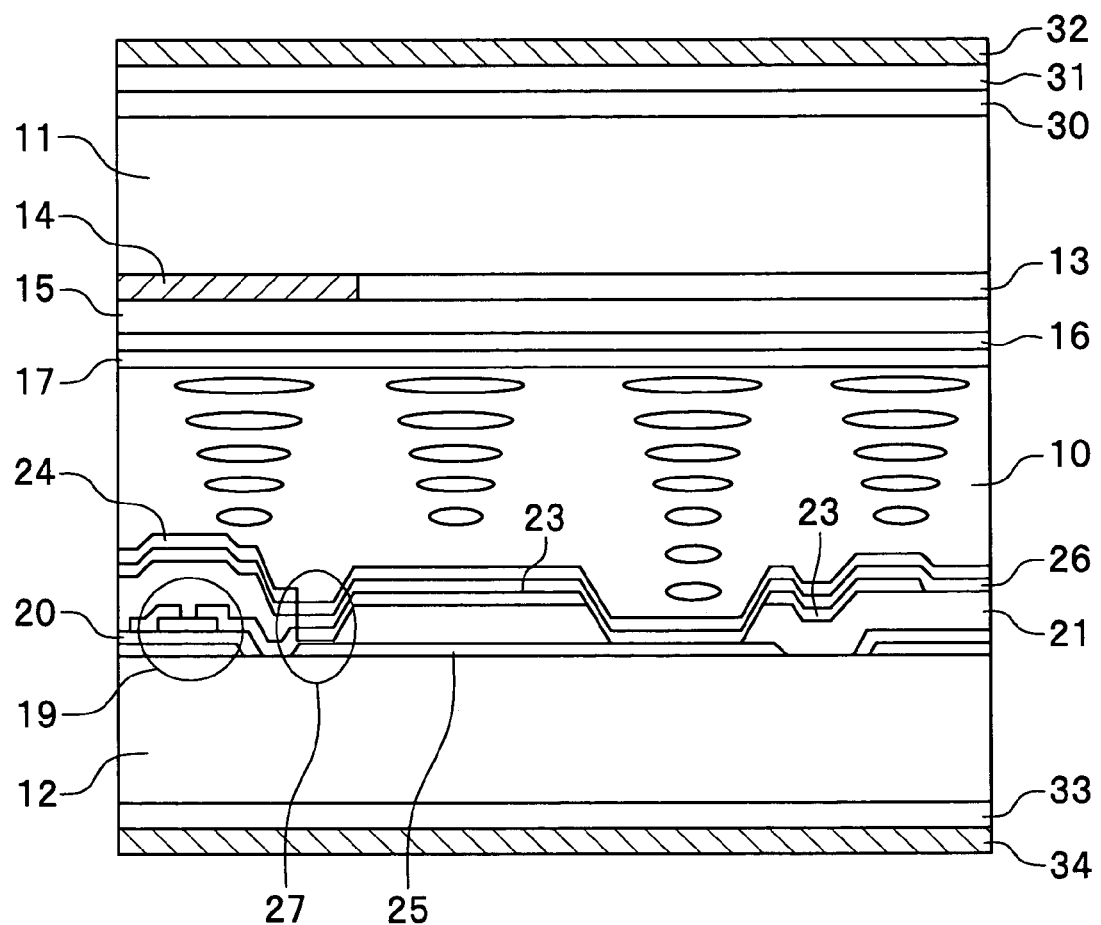
FIG. 1 is a section drawing showing a configuration of a liquid crystal display device of an embodiment 1.

A section of a liquid crystal display device of the invention is shown in FIG. 1. It is mainly configured of a first substrate 11, liquid crystal layer 10, and a second substrate 12; and the first and second substrates pinch the liquid crystal layer.

The first substrate has at a side adjacent to the liquid crystal layer a color filter 13, black matrix 14, flattening layer 15, common electrode 16, and first orientation film 17.

The second substrate has at a side adjacent to the liquid crystal layer a thin film transistor 19 and second orientation film 24. The thin film transistor is an inverted-stagger type and is connected with a scan wiring, signal wiring, reflective electrode 23, and transparent electrode 25. The scan wiring and signal wiring are insulated with a first insulation layer 20, and the reflective electrode and transparent electrode are insulated with a second insulation layer 21. The reflective electrode and thin film transistor are coupled with a through hole 27. On an upper surface of the reflective electrode exists a third insulation layer 26, on that of the third insulation layer exists the second orientation film, and being adjacent to the liquid crystal layer, the film prescribes its orientation direction.

The reflective electrode is disposed on an upper portion of the transparent electrode and the disposed portion of the reflective electrode is a reflective display unit. A portion where the transparent electrode is disposed and not shielded by the reflective electrode is a transparent display unit. In the reflective display unit lights pass two times, whereas in the transparent display unit they pass only one time, so a light path length of the transparent display unit becomes shorter than that of the reflective display unit. In order to diminish a light pass difference between the reflective display unit and transparent display unit, the transparent electrode is designed to be disposed below the reflective electrode and a liquid crystal layer thickness in the transparent display unit is designed to be made thicker than that in the reflective display unit. The difference of the liquid crystal layer thicknesses is decided by a total thickness of the second insulation layer, reflective electrode, and third insulation layer, and the respective layer thicknesses are 1.3 µm, 0.12 µm, and 0.12 µm, thereby the difference of the liquid crystal layer thickness becoming 1.54 µm.

The first substrate is made of borosilicic acid glass and its thickness is 0.7 mm. The color filter repeatedly arrays each portion showing red, green, and blue colors like stripes; and in a portion corresponding to the scan wiring, the substrate has the black matrix made of resin. A concavity and convexity due to the color filter and black matrix are flattened by a flattening layer made of resin. The common electrode is made of indium tin oxide (ITO) and the first orientation film is Sun Ever manufactured by Nissan Chemical Industries, Ltd.

The second substrate is made of borosilicic acid glass like the first substrate and its thickness is 0.7 mm. The second orientation film is Sun Ever manufactured by Nissan Chemical Industries, Ltd. like the first orientation film. The signal wiring and scan wiring are made of chromium and the first and second insulation layers are a silicon nitride film.

The invention performs the dark display in no voltage application and adopts the normally closed type where the reflectivity increases with a voltage application. Its reason is shown as follows: As described before, the reflectivity in the dark display is influenced by the visual dependability of the reflectivity. If an ideal dark display is realized in a normal line direction, a phase difference of the normal line direction is a ¼ wavelength. If the phase difference varies from the ¼ wavelength according to a visual angle variation, the reflectivity increases according to the visual angle variation. Since the increase of the reflectivity according to the visual angle variation corresponds to a phase difference variation according to the visual angle variation, it is possible to evaluate the increase of the reflectivity according to the visual angle variation by replacing the increase with visual characteristics of the phase difference.

Figure 14:
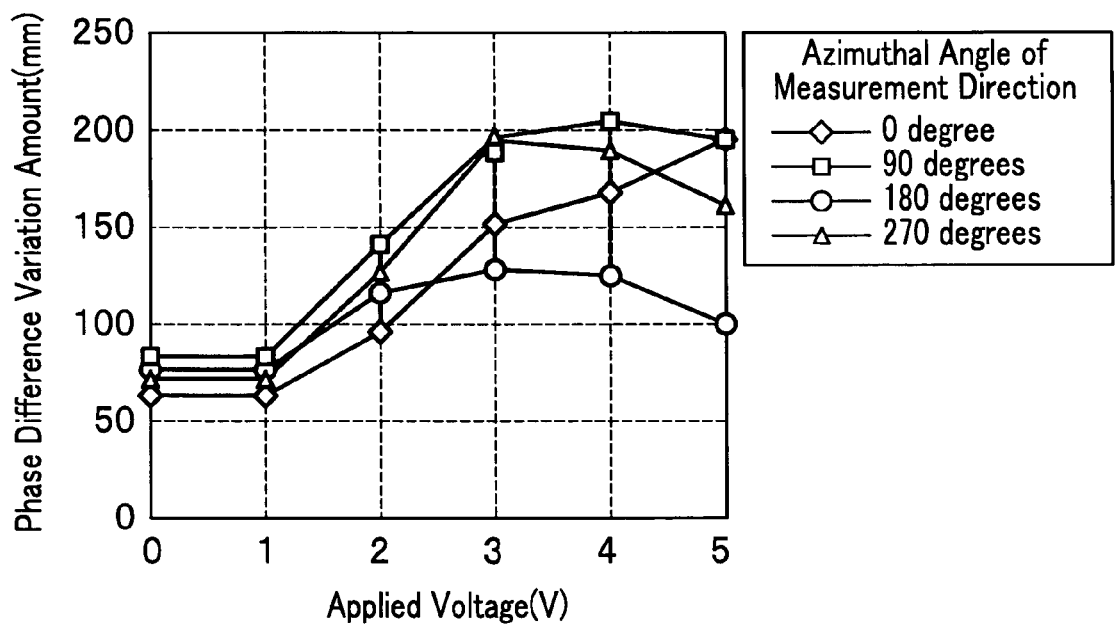
FIG. 14 is a drawing showing an applied voltage dependability of a phase difference variation amount.

Measure phase difference variation amounts between noticed visual angle directions and normal line direction and plot them for applied voltages. A result is shown in FIG. 14. Attention is focused on four visual angle directions, that is, directions of polar angle 40 degrees in azimuthal angles 0, 90, 180, and 270 degrees. Although values of phase difference variation amounts themselves are different according to the visual angle directions, a tendency that any one becomes minimum in applied voltage 0 V is common. In the applied voltage 0 V the phase difference variation amounts according to the visual angle directions become minimum in almost all visual angle directions.

From FIG. 14 assuming that the applied voltage 0 V is the dark display, it is foreseen that an increase of a reflectivity is also comparatively small in a slanted visual direction from a normal line direction and a higher contrast ratio is obtained regardless of incident angles of outside lights. In FIG. 14, for example, focusing attention on the phase difference variation amounts in applying higher voltages 4V, 5V, and the like, any amounts turn out to be larger compared with those of the applied voltage 0 V. Accordingly, if a voltage applying occasion is made the dark display like the normally open type, the reflectivity drastically increases as the outside lights deviate from the normal line direction, and it is foreseen that the contrast ratio is remarkably lowered depending on the incident angles of the outside lights if any.

Figure 20A:
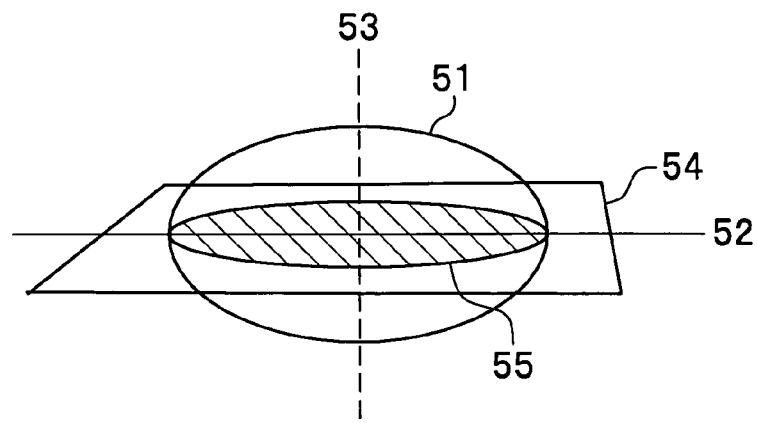
FIG. 20A is a drawing of a refractivity elliptical body illustrating visual angle characteristics of a liquid crystal layer in no voltage application represented as the refractivity elliptical body making a primary axis horizontal.
Figure 20B:
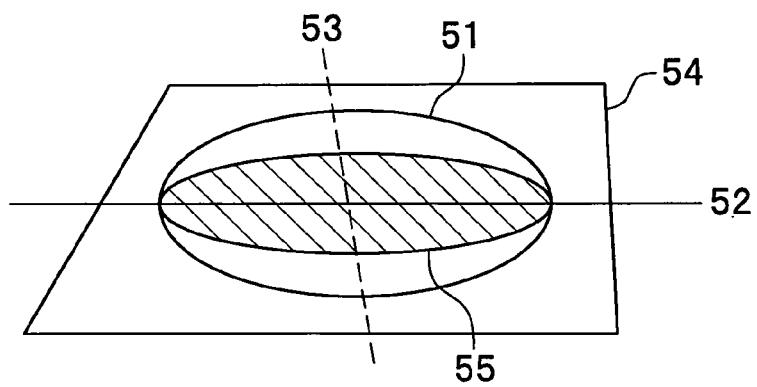
FIG. 20B is a drawing of a refractivity elliptical body in a case that the observation direction is rotated in a plane including the primary axis.
Figure 20C:
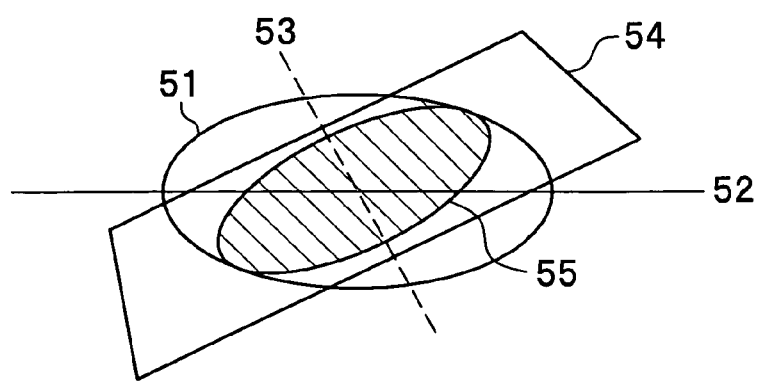
FIG. 20C is a drawing of refractivity elliptical body in a case that the observation direction is rotated in a vertical plane for the primary axis.
Figure 21:
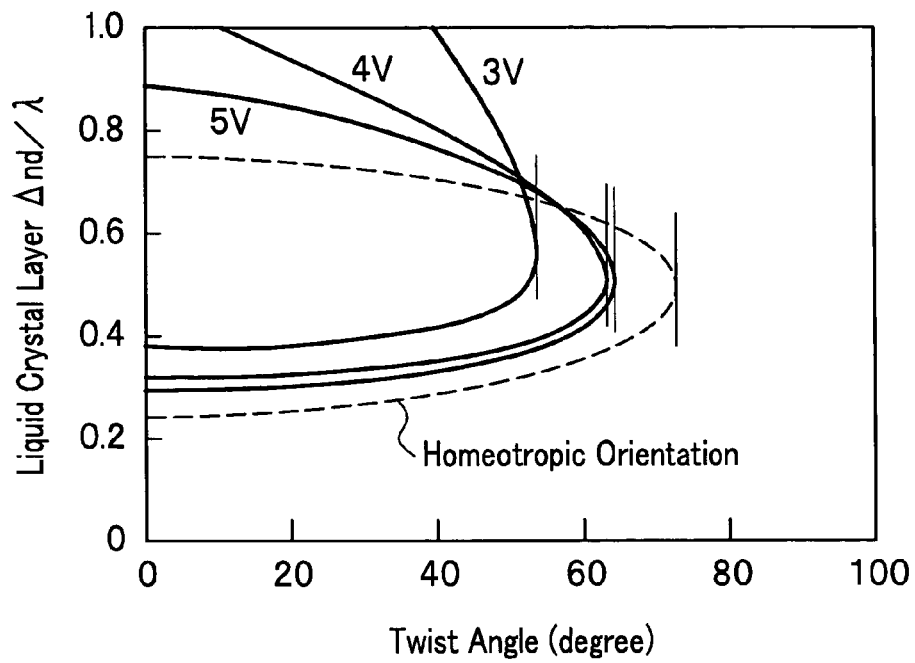
FIG. 21 is a drawing showing a relationship between a retardation (normalized by a wavelength) and twist angle of a liquid crystal layer giving an achromatic color reflection display.
Figure 22:
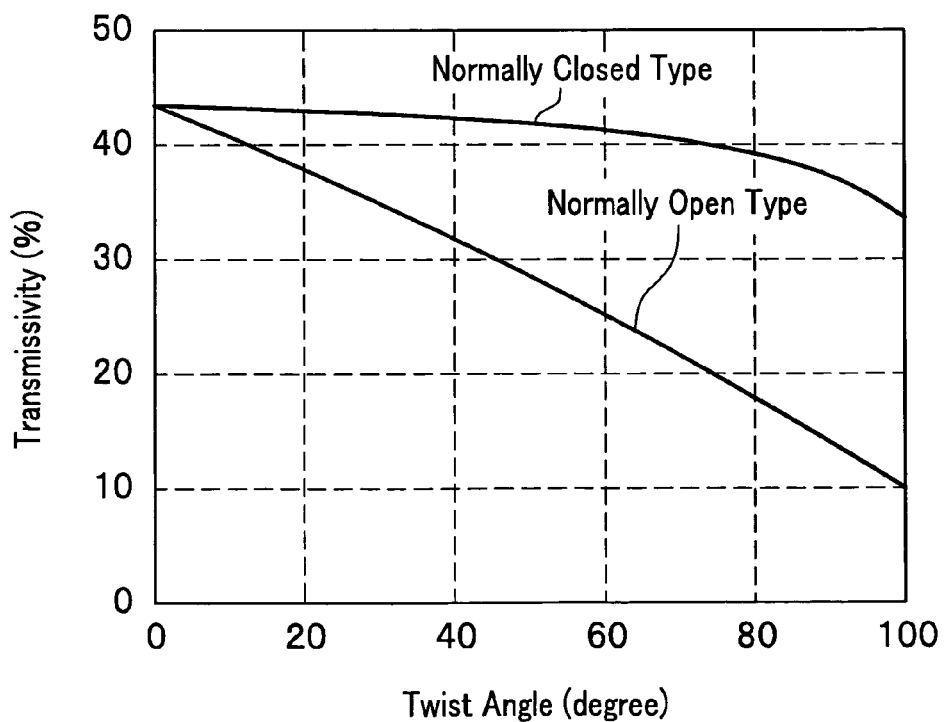
FIG. 22 is a drawing showing a twist angle dependability of a transmissivity in a partial transmissive type display mode for a normally closed type display and normally open type display.

This is foreseen alike from a consideration concerning visual characteristics using a refractivity elliptical body. If approximating a liquid crystal layer with a one-axial medium, a double refraction in an arbitral direction is represented as the section (ellipse) shape made in a vertical plane for an observed direction as described before. A liquid crystal layer in no voltage application is proximately represented as a refractivity elliptical body 51 making a primary axis 52 horizontal as shown in FIG. 20A. Observing from a normal line direction then, an observation direction 53 becomes a vertical direction for the primary axis. A shape of a section 55 made in a vertical plane for the observation direction becomes an ellipse making the primary axis of the refractivity elliptical body a long axis as shown in FIG. 20A. A case that the observation direction is rotated in a plane including the primary axis is shown in FIG. 20B. In addition, another case that the observation direction is rotated in a vertical plane for the primary axis is shown in FIG. 20C. In the case of FIG. 20C a variation of a section shape according to that of the observation direction is comparatively small; and particularly, in the case of FIG. 20B a section shape does not vary. Thus is shown that the normally closed type making a dark display occasion no voltage applying occasion is small in double refraction variations according to visual variations and also small in phase difference variations.

Figure 19A:
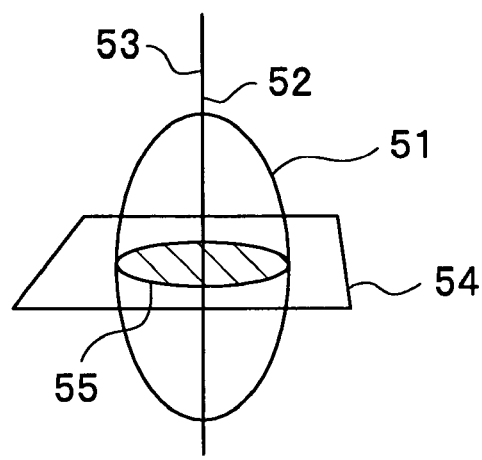
FIG. 19A is a drawing of a refractivity elliptical body illustrating visual angle characteristics of a liquid crystal layer in a voltage application represented as a refractivity elliptical body making a primary axis parallel to a normal line direction.
Figure 19B:
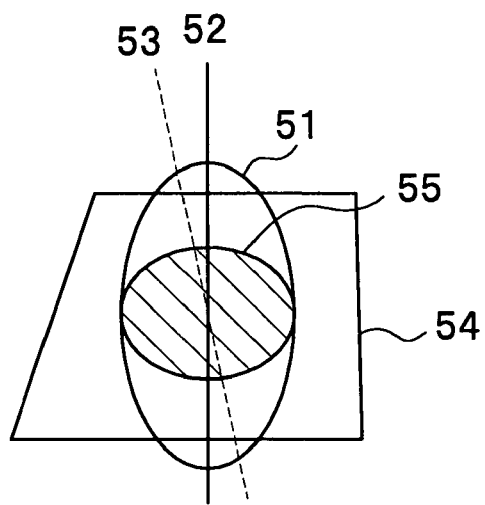
FIG. 19B is a drawing of a refractivity elliptical body in a case that the observation direction is rotated.

On the other hand, a liquid crystal layer in a voltage application is proximately represented as a refractivity elliptical body 51 making a primary axis 52 parallel to a normal line direction as shown in FIG. 19A. Observing from a normal line direction then, an observation direction 53 becomes a vertical direction for the primary axis. A shape of a section 55 made in a vertical plane for the observation direction becomes a circle making a vertical direction of a primary axis 52 of a refractivity elliptical body 51 a long axis as shown in FIG. 19A. A case that the observation direction 53 is rotated is shown in FIG. 19B. Compared with the case of FIG. 20A, the variations of the section shapes are comparatively large. Thus is shown that the normally open type making a dark display occasion a voltage applying occasion is large in double refraction variations according to visual variations and also large in phase difference variations. Meanwhile, a number 54 is a vertical plane for the observation direction; and a number 55 is a section of the refractivity elliptical body in the vertical plane for the observation direction.

Thus, it is one of advantages of the normally closed type for the normally open type that the visual angle characteristics of the dark display is favorable, and is also one of reasons why the normally closed type is adopted in the invention. Accordingly, the embodiment results in adopting the normally closed type. A twist angle of the liquid crystal layer is made 50 degrees that is easy to obtain the color free reflective luminous display when driven in a comparatively low voltage of some 3V as described before.

The embodiment respectively sets in the reflective display unit: the liquid crystal layer thickness, 3.8 µm; a double refractivity, 0.072; a twist angle of the liquid crystal layer, 50 degrees; a retardation of a phase plate, 395 nm; a delay phase axis azimuthal angle of the phase plate, 80 degrees; and an absorption axis azimuthal angle of the polarization plate, 92 degrees.

Here, observing the liquid crystal display device from a normal line direction of the upside substrate and making a twist angle of a liquid crystal layer $\Phi$, define an azimuthal angle counterclockwise by making an orientation processing direction of the downside substrate 0.5 $\Phi$ degrees.

Next, set parameters of the upside phase plate and downside polarization plate.

Use a fluorine liquid crystal material with a higher resistance as a liquid crystal layer. Disperse polymer beads of a true sphere shape of which diameter is 4.0 µm by about 100 pieces per 1 $mm^2$ and make a liquid crystal layer thickness in the reflective display unit 3.8 µm almost overall uniformly.

Dispense an orientation processing to the first orientation film and second orientation film by a rubbing method. Make a rotation number of a rubbing roll 3000 rpm, a width of a contact portion with a substrate of the rubbing roll 11 mm, and a pre-tilt angle of the liquid crystal layer about 5 degrees. In addition, set a direction of the orientation processing as needed, assemble the first substrate and second substrate, and make the twist angle of the liquid crystal layer become 50 degrees when injecting the liquid crystal material.

Use an NRZ phase plate manufactured by NITTO DENKO CORP. as an upside phase plate 31, and SEG1425DUHCARS also manufactured by NITTO DENKO CORP. as an upside polarization plate 32.

Use an NRF phase plate manufactured by NITTO DENKO CORP. as a downside phase plate 33, and set a retardation 200 nm and a delay phase axis azimuthal angle 120 degrees. Use SEG1425DU also manufactured by NITTO DENKO CORP. as a downside polarization plate 34 and set its absorption axis azimuthal angle 90 degrees.

Figure 9:
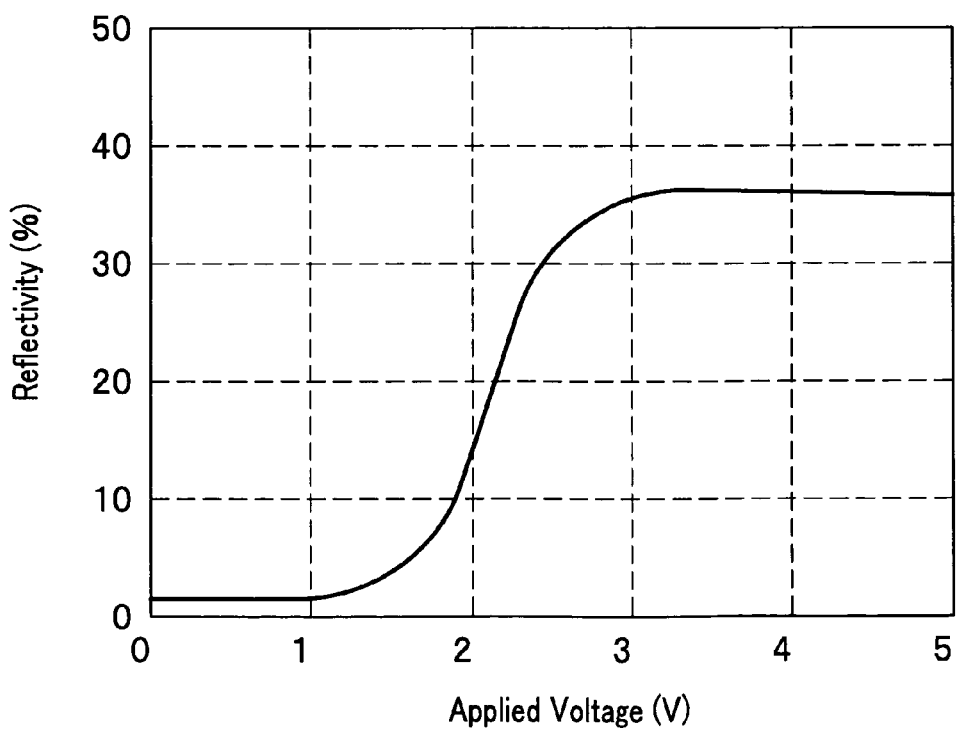
FIG. 9 is a drawing showing applied voltage characteristics of a reflectivity of the liquid crystal display device of the embodiment 1.

Evaluate the reflective display characteristics of the liquid crystal display device made as described above. Although the reflective display characteristics vary depending on incident conditions of light source lights, here use an integrating sphere light source as a light source and design so that lights are uniformly entered from within a solid angle range of 26 degrees. Measure a brightness of a standard diffusion plate in the same condition and make it a reflectivity of 100%. A result where an applied voltage dependability is evaluated is shown in FIG. 9. Obtained are the display characteristics of the normally closed type that in no voltage application the reflectivity becomes minimum and then with a voltage application it increases. In addition, the maximum value of the reflectivity is obtained in a vicinity of an applied voltage of 3.3 V and the reflectivity then is 36.5%; and the contrast ratio is 15 versus 1.

Figure 10:
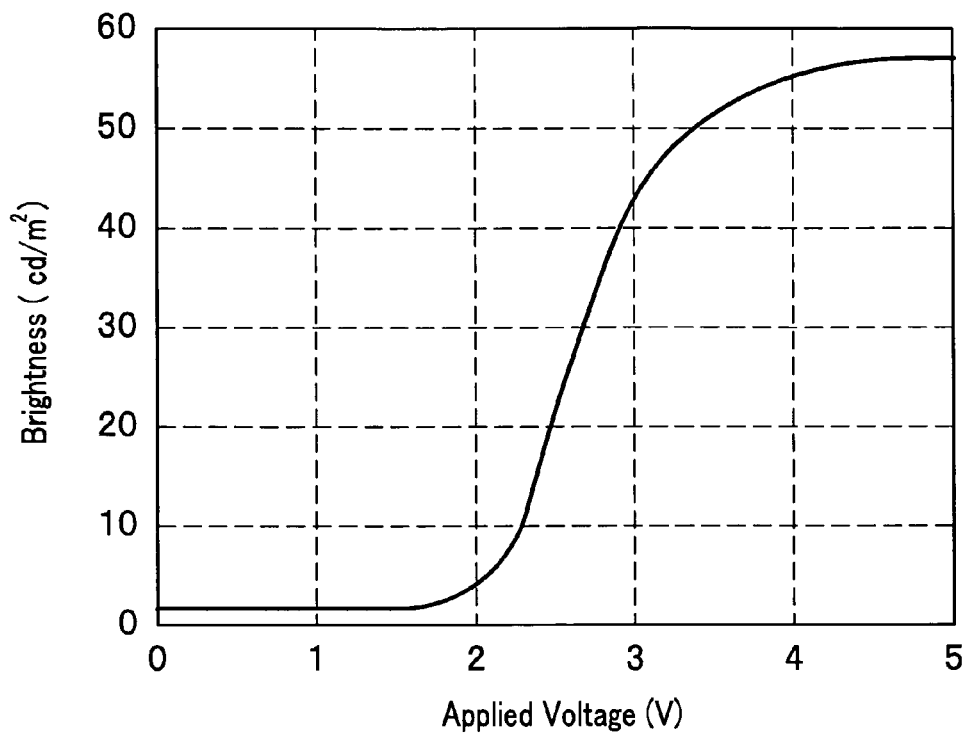
FIG. 10 is a drawing showing applied voltage characteristics of a brightness in a transmissive display of the liquid crystal display device of the embodiment 1.

Next, dispose a backlight light source at a back face of the liquid crystal display device and evaluate transmissive characteristics. Use three electro-luminescence light sources emitting white color lights as the backlight light source. A result where an applied voltage dependability of a surface brightness is evaluated is shown in FIG. 10. Like the reflective display are obtained the display characteristics of the normally closed type that in no voltage application the surface brightness becomes minimum and then with a voltage application it increases. In addition, is 53 $cd/m^2$ the surface brightness in the applied voltage of 3.3 V where the maximum value of the reflectivity is obtained. And the contrast ratio is 21 versus 1.

Thus, by adopting the normally closed type is obtained a reflective liquid crystal display device that is excellent in visual characteristics and shows a higher contrast ratio.

Embodiment 2

The invention decides a target value of a contrast ratio in a reflective display as follows: When a liquid crystal display device of the invention is applied to a cellular phone and hand-held terminal, a protector is disposed on an upper surface of the liquid crystal display device to protect it from an impact. Since an air layer intervenes between the protector and liquid crystal display device, an interface reflection occurs in the upper surfaces of the protector and liquid crystal display device. Even if reducing the interface reflection by forming a reflection prevention layer on the upper surfaces of the protector and liquid crystal display device, the interface reflection of about 1% occurs in each interface, thereby the interface reflection of about 2% occurring in total. Assuming that a luminous display reflectivity is 24%, a contrast ratio then is about 12 versus 1. That is, about 12 versus 1 is the upper limit value of the contrast ratio decided by the interface reflection. Therefore, the invention puts the target value of the contrast ratio of the reflective display on 12 versus 1.

Figure 11:
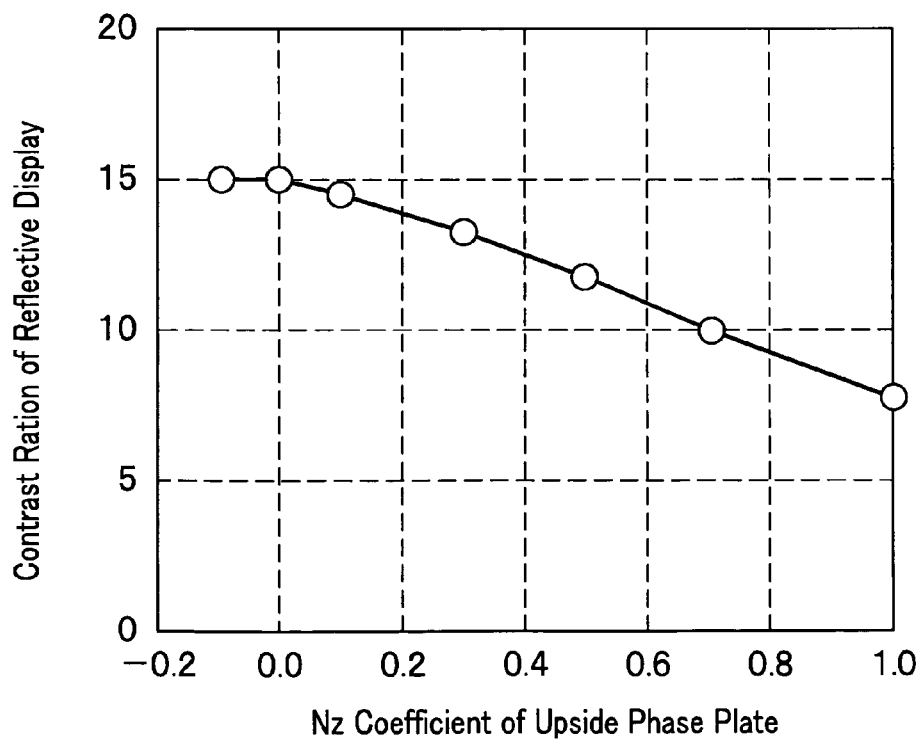
FIG. 11 is a drawing showing an Nz coefficient dependability of a contrast ratio of a reflective display.

Although the embodiment 1 sets the Nz coefficient of the upside phase plate 0.0, the embodiment varies it by six kinds, −0.1, 0.1, 0.3, 0.5, 0.7, and 1.0 other than 0.0 and measures the reflective display characteristics. Its result is shown in FIG. 11. The contrast ratio increases with a decrease of the Nz coefficient, and when the Nz coefficient is not more than 0.5, the contrast value not less than the target value of 12 versus 1 is obtained.

Figure 12:
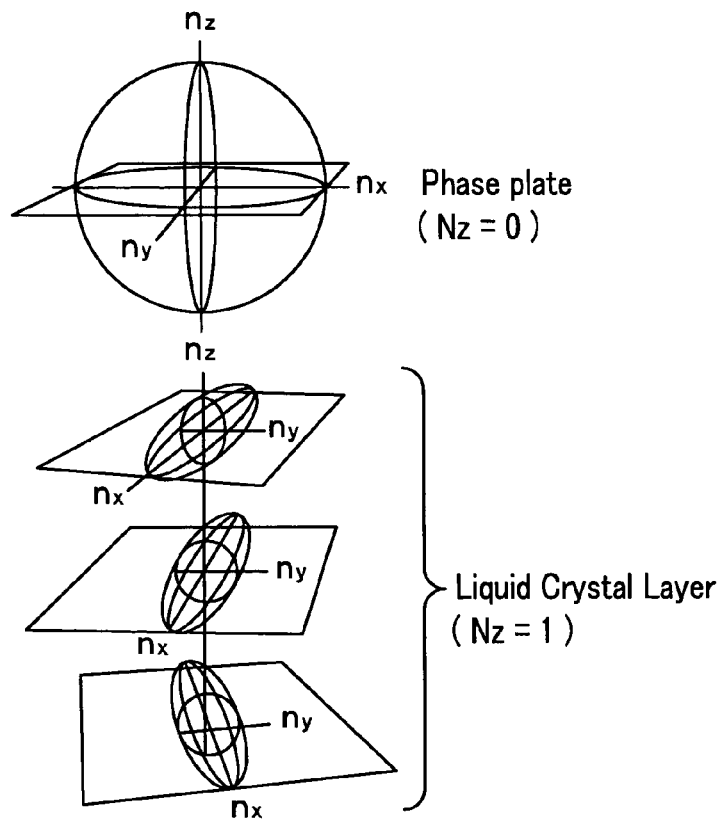
FIG. 12 is a drawing showing a combination of refractivity elliptical bodies of a phase plate and a liquid crystal layer giving a higher contrast ratio.
Figure 13:
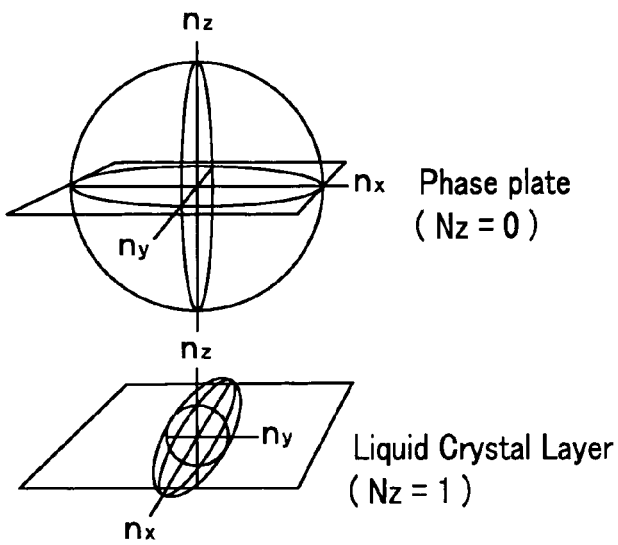
FIG. 13 is a drawing showing a combination of refractivity elliptical bodies of a phase plate and a liquid crystal layer giving a higher contrast ratio when assuming that a liquid crystal layer is proximately a one-axial medium.

A reason why the contrast ratio is improved when the Nz coefficient is decreased is described as follows: A delay phase axis and proceeding phase axis acting on lights entered in an optical anisotropic medium are decided by a long axis and short axis in a section (ellipse) of a refractivity elliptical body where a light incident direction becomes a normal line direction. As shown in FIG. 13, when combining a one-axial medium of an Nz coefficient of 1.0 with a phase plate of an Nz coefficient of 0.0, and seen from the normal line direction, disposing them so that the delay phase axis of the phase plate and an orientation direction of a liquid crystal layer are orthognalized, the delay phase axes of the phase plate and liquid crystal layer are orthogonalized in all visual directions. Then, the phase differences of the phase plate and liquid crystal layer are favorably compensated even in the visual directions. Practically, the liquid crystal layer of the single polarization plate display mode is the twist orientation as shown in FIG. 12. But the twist angle is not more than 90 degrees and small, so its optical characteristics are close to the one-axial medium of an Nz coefficient of 1.0 and the above condition proximately consists. Therefore, if the Nz coefficient decreases, a shape and disposition of the refractivity elliptical body of the phase plate and liquid crystal layer near an ideal condition shown in FIG. 13, thereby their phase differences becoming favorably compensated in a wider range of visual directions.

Since in the embodiment the twist angle is 50 degrees and small, the optical characteristics of the liquid crystal layer are close to the one-axial medium of an Nz coefficient of 1.0. In addition, the delay phase axis of the phase plate is set 80 degrees. This corresponds to 105 degrees for the orientation direction of the upside substrate and 80 degrees for an average direction of a liquid crystal orientation (orientation direction at a center of the liquid crystal layer), and these turn out to be close to the condition shown in FIG. 13. In such the phase plate disposition, if the Nz coefficient is neared to an ideal value, 0.0, the phase differences of the phase plate and liquid crystal layer are favorably compensated, thereby a higher contrast ratio being obtained.

Figure 15:
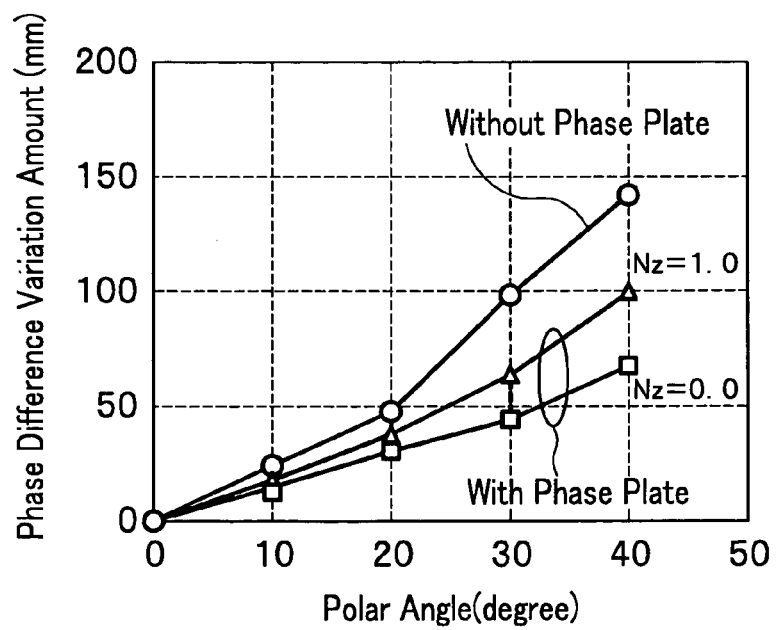
FIG. 15 is a drawing showing a visual angle dependability of a phase difference variation amount.

A result experimentally proving the above is shown in FIG. 15. A longitudinal axis of FIG. 15 is a phase difference variation amount making a phase difference in a normal line direction a reference and FIG. 15 is a result where the visual characteristics of the phase difference variation amount are measured. Compared with a case of the liquid crystal layer only, the phase difference variation amount is decreased when the phase plate is used. In addition, the phase difference variation amount is further decreased when the Nz coefficient of the phase plate is 0.0 than 1.0, thereby it being ensured that a higher contrast ratio is obtained in the case that the Nz coefficient of the phase plate is 0.0 than 1.0.

Focusing attention on a material of a phase plate, the phase plate made of polycarbonate allows phase plates different in the Nz coefficient to be made as above. Therefore, as an upside phase plate the phase plate made of polycarbonate is suitable.

Thus, by making the Nz coefficient not more than 0.5, a contrast ratio not less than the target value of 12 versus 1 is obtained.

Embodiment 3

In the liquid crystal display device of the embodiment 1, the downside phase plate is changed to an NAF phase plate manufactured by NITTO DENKO CORP. The contrast ratio of the trasmissive display is improved to 42 versus 1.

Figure 17:
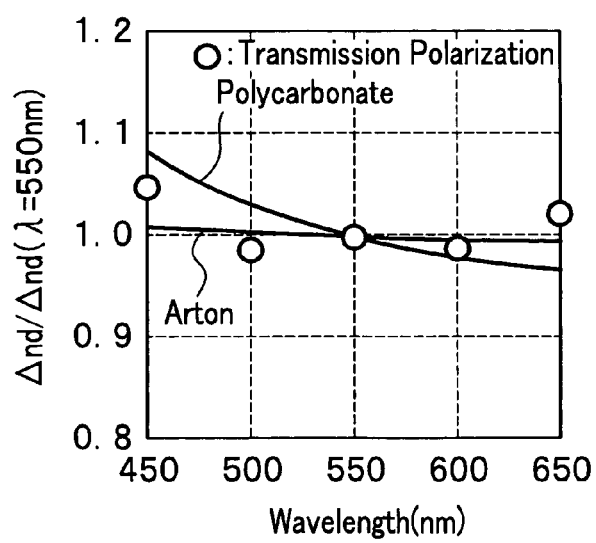
FIG. 17 is a drawing showing a double refraction wavelength dependability of a phase plate needed for converting polarization lights passing through a dark display an upside polarization plate, upside phase plate, and transmissive display unit liquid crystal layer to a linear polarization, and the dependability of a phase plate made of polycarbonate and a phase plate made of Arton.

The NAF phase plate consists of Arton. A wavelength dependability of a double refraction normalized by a value in an Arton wavelength of 550 nm is shown in FIG. 17. Compared with polycarbonate (composing the NRF phase plate) included in FIG. 17, Arton has a characteristic that the wavelength dependability of the double refraction is small.

Figure 23:
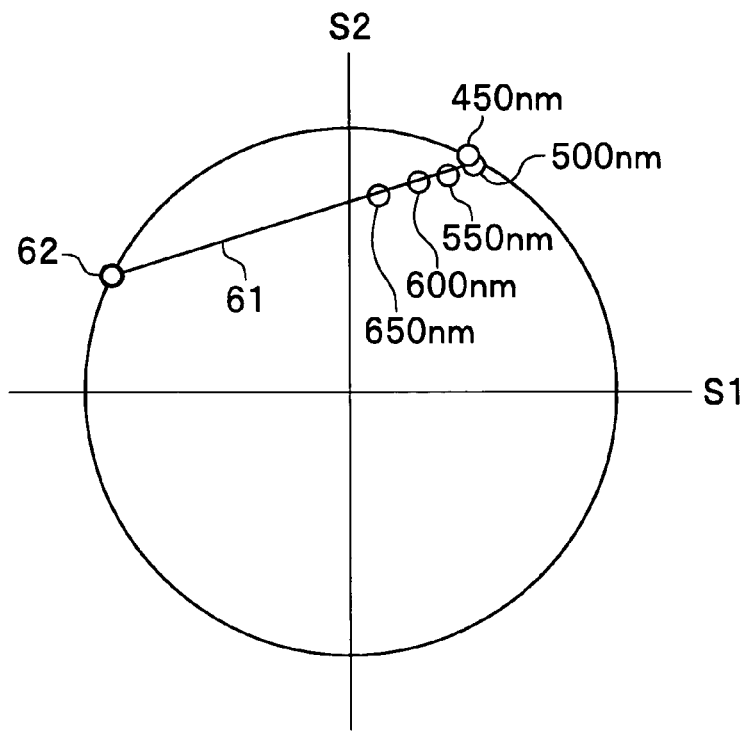
FIG. 23 is a drawing showing a polarization state of each wavelength light passing through an upside phase plate, upside polarization plate, and liquid crystal layer.

In the dark display a stacked layer of the upside polarization plate, upside phase plate, and transmissive display unit liquid crystal layer shows optical characteristics close to a double refraction medium. That is, in a notation of a polarization state stokes parameters (S1, S2, and S3) are generally used, and when in the dark display the polarization state of lights that pass through the upside polarization plate, upside phase plate, and transmissive display unit liquid crystal layer is measured at each point of a visual wavelength and plotted on a (S1, S2) plane, each plot showing the polarization state of a transmissive light of each wavelength (450 nm, 500 nm, 550 nm, 600 nm, and 650 nm) shows a characteristic that it approximately linearly distributes as shown in FIG. 23. a number 61 represents a line piercing the plot of each the wavelength. In addition, a number 62 represents an intersection of a line piercing the plot of each the wavelength and the (S1, S2) plane. This is a characteristic shown by the polarization state of lights passing through the double refraction medium and indicates that the stacked layer is approximately similar in an optical characteristic to the double refraction medium. By using one downside phase plate and optimizing a wavelength dependability of its double refraction, a dark display transmissivity can be sufficiently reduced.

Moreover, from the plots of the (S1, S2) plane the wavelength dependability of the double refraction requested for the downside phase plate can be obtained. Its concrete procedure is shown as follows: To begin with, since the plot of the transmissive light of each wavelength approximately linearly distributes in the (S1, S2) plane, obtain the line 61 approximating the distribution. Then, obtain the point 62 where the line intersects the coordinates of the (S1, S2) plane representing a linear polarization. The coordinates of the (S1, S2) plane representing the linear polarization are coordinates satisfying an equation, $S1^2+S2^2=1$, and this corresponds to a peripheral portion of the (S1, S2) plane. That is, obtain a point where a line piercing the plot of each the wavelength intersects the peripheral portion of the (S1, S2) plane. According to this, a rotation angle θ needed for moving each plot to the intersection is geometrically obtained. Here, the θ is converted to a retardation Δnd according to a following equation 2:

$$\Delta nd = \theta\lambda/2\pi,\qquad (eq.\ 2)$$

where λ is a wavelength of a transmissive light.

By obtaining the retardation in each the wavelength, the wavelength dependability of the retardation requested for the phase plate can be obtained. Obtain the retardations requested for the downside phase plate in the wavelengths 450 nm, 500 nm, 550 nm, 600 nm, and 650 nm, and include values normalized by the value in the wavelength 550 nm in FIG. 17 with circles ○. Excluding the wavelength 450 nm, any other plots of the wavelengths show a distribution close to the wavelength dependability of the double refraction of Arton. According to this, in order to reduce the dark display transmissivity and improve the high contrast ratio of the transmissive display, a phase plate like the NAF phase plate consisting of Arton is suitable.

In addition, polyvinyl alcohol is known to show the double refraction with a less dependability on wavelengths like Arton. Particularly, when an antiweatherability is not requested, polyvinyl alcohol is also suitable for the downside phase plate.

Embodiment 4

Figure 16:
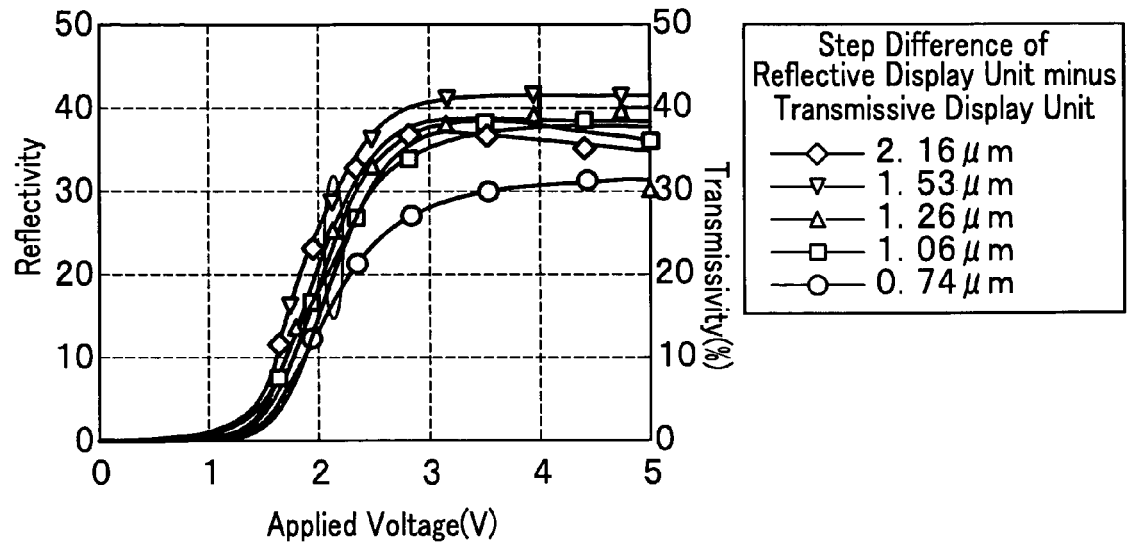
FIG. 16 is a drawing showing applied voltage characteristics of a transmissivity when variously changing step (thickness) differences between a reflective display unit and a transmissive display unit.

The transmissivity of the transmissive display unit depends on a liquid crystal layer thickness. Prepare a transparent substrate with a pair of transparent electrodes and put together them variously changing the liquid crystal layer thickness of the transmissive display unit, thereby making a liquid crystal display element. Pasting an upside phase plate and upside polarization plate by the specification similar to the embodiment 1, also make the twist angle of a liquid crystal layer 50 degrees like the embodiment 1. Respectively set the optical parameters of a downside phase plate and downside polarization plate with the similar method of the embodiment 1. In FIG. 16 is shown a result where the applied voltage dependability of the transmissibity for each liquid crystal display element is measured. As the liquid crystal layer thickness increases, a maximum value of the transmissivity increases and a steepness of a curve of the transmissivity versus the applied voltage also increases. When making a step difference between the reflective display unit and transmissive display unit 1.5 μm, both of the transmissivity and steepness become maximum. Even when further increasing the step difference between the reflective display unit and transmissive display unit and making it 2.16 μm, the maximum value of the transmissivity does not increase any more and almost hits its ceiling.

Figure 24:
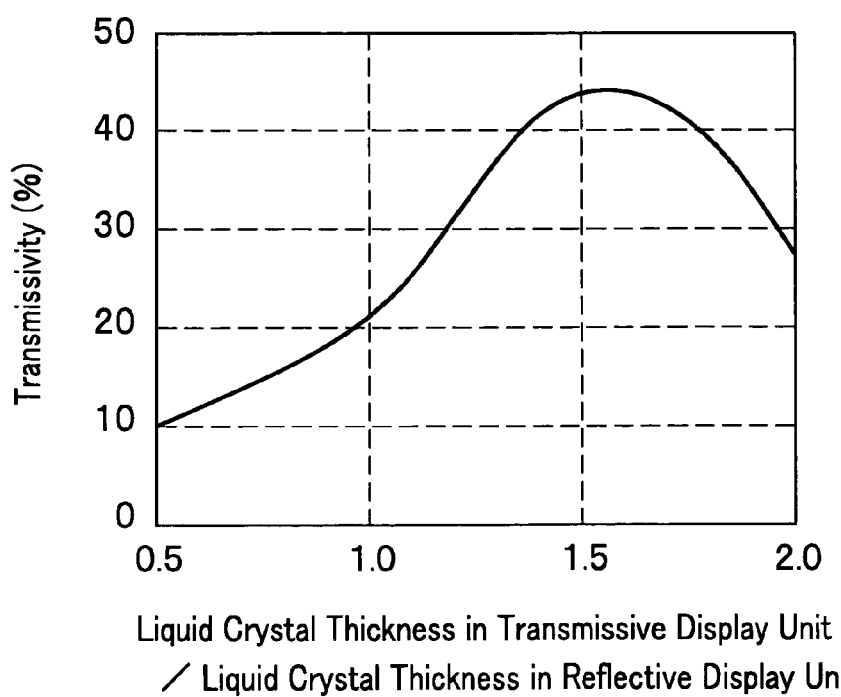
FIG. 24 is a drawing showing a dependability of a transmissivity on a ratio of liquid crystal layer thicknesses of a transmissive display unit and a reflective display unit in a partial transmissive type display mode for a normally closed type display.

For the transflective liquid crystal display device of the embodiment, a result where the transmissivity is calculated for the ratio of the liquid crystal layer thicknesses of a transmissive display unit and reflective display unit is shown in FIG. 24. When making the ratios of the thicknesses approximately not less than 1.4, the transmissivity exceeds 40% and almost reaches a maximum value.

In FIG. 16 is included a result where the applied voltage dependability of the reflectivity of the reflective display unit is measured. A shape of the curve of the transmissivity versus the applied voltage becomes most approximated to the curve of the reflectivity versus the applied voltage when the step difference between the reflective display unit and transmissive display unit is made 1.5 μm. The ratio of the liquid crystal layer thicknesses of the transmissive display unit and reflective display unit then is approximately 1.4 versus 1.

Thus, when making the ratio of the liquid crystal layer thicknesses of the transmissive display unit and reflective display unit approximately 1.4 versus 1, both of the reflectivity and transmissivity can obtain values close to upper limit values of efficiencies by absorptions of the polarization plate.

Embodiment 5

In a configuration of using one phase plate, perform a calculation using Jones Matrix in order to widely obtain a delay phase axis azimuthal angle and retardation of an upside phase plate and an absorption axis azimuthal angle of an upside polarization plate giving the reflective display of the normally closed type. The optical characteristics of a normal line direction of a liquid crystal layer in no voltage application is described in a form of Jones Vector in the document by S. Chandrasekar, et al. described before. Assuming that transmissive lights entered in a liquid crystal layer is a circular polarization, calculate a polarization state after the transmissive lights pass through the liquid crystal layer. Moreover, if the transmissive lights are converted so as to become same linear polarized lights across a wide range of the visible light areas using a phase plate and a polarization plate is disposed so that an absorption axis becomes parallel to a vibration direction of the linear polarized lights, the reflectivity of the dark display can be reduced.

For the twist angle of the liquid crystal layer, focus attention on a vicinity of 50 degrees where a color free luminous display is easy to be obtained when driven with comparatively a low voltage of some 3 V. In the vicinity of the twist angle of 50 degrees, obtain the retardation of the liquid crystal layer, the retardation and delay phase axis azimuthal angle of the upside phase plate, the absorption axis azimuthal angle of the upside polarization plate satisfying the above. Results are shown in from FIG. 2 to FIG. 6. In FIGS. 2 to 6 the distribution areas of the optical parameters giving favorable contrast ratios are shown with oblique lines.

Figure 2:
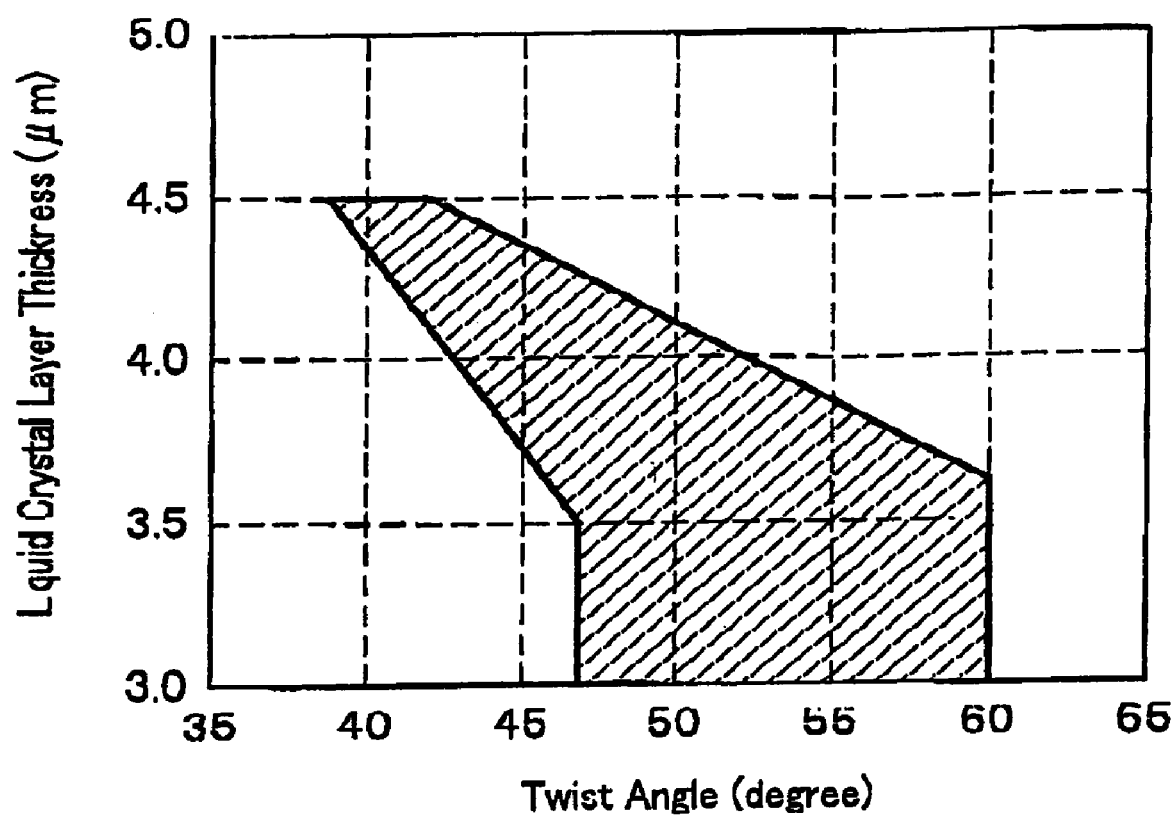
FIG. 2 is a drawing showing a combination of a liquid crystal layer thickness and twist angle giving a favorable contrast ratio.

A lateral axis of FIG. 2 is the twist angle and the longitudinal axis is the liquid crystal layer thickness. In FIG. 2 Δn of a liquid crystal material is assumed to be 0.072, so it is possible to covert the longitudinal axis of FIG. 2 to the Δnd of the liquid crystal layer by multiplying the axis by 0.072. In FIG. 2 an area giving the favorable contrast ratios distributes on a polygon consisting of apexes of six points: (twist angle, liquid crystal layer thickness)=(47 degrees, 3.0 μm), (60 degrees, 3.0 μm), (60 degrees, 3.6 μm), (42 degrees, 4.5 μm), (39 degrees, 4.5 μm), and (47 degrees, 3.5 μm). By multiplying the Δn of 0.072 of the liquid crystal material and converting these to the Δnd of the liquid crystal layer is made another polygon consisting of apexes of six points: (twist angle, Δnd)=(47 degrees, 216 nm), (60 degrees, 216 nm), (60 degrees, 259 nm), (42 degrees, 324 nm), (39 degrees, 324 nm), and (47 degrees, 252 nm). According to these, the range of the twist angles giving the favorable contrast ratios is obtained as not less than 39 degrees and not more than 60 degrees. The range of the liquid crystal layer thicknesses giving the favorable contrast ratios is obtained as not less than 3.0 μm and not more than 4.5 μm, and these being converted multiplied by the Δn of 0.072 of the liquid crystal material to the Δnd of the liquid crystal layer, the Δnd is obtained as not less than 216 nm and not more than 324 nm.

Figure 3:
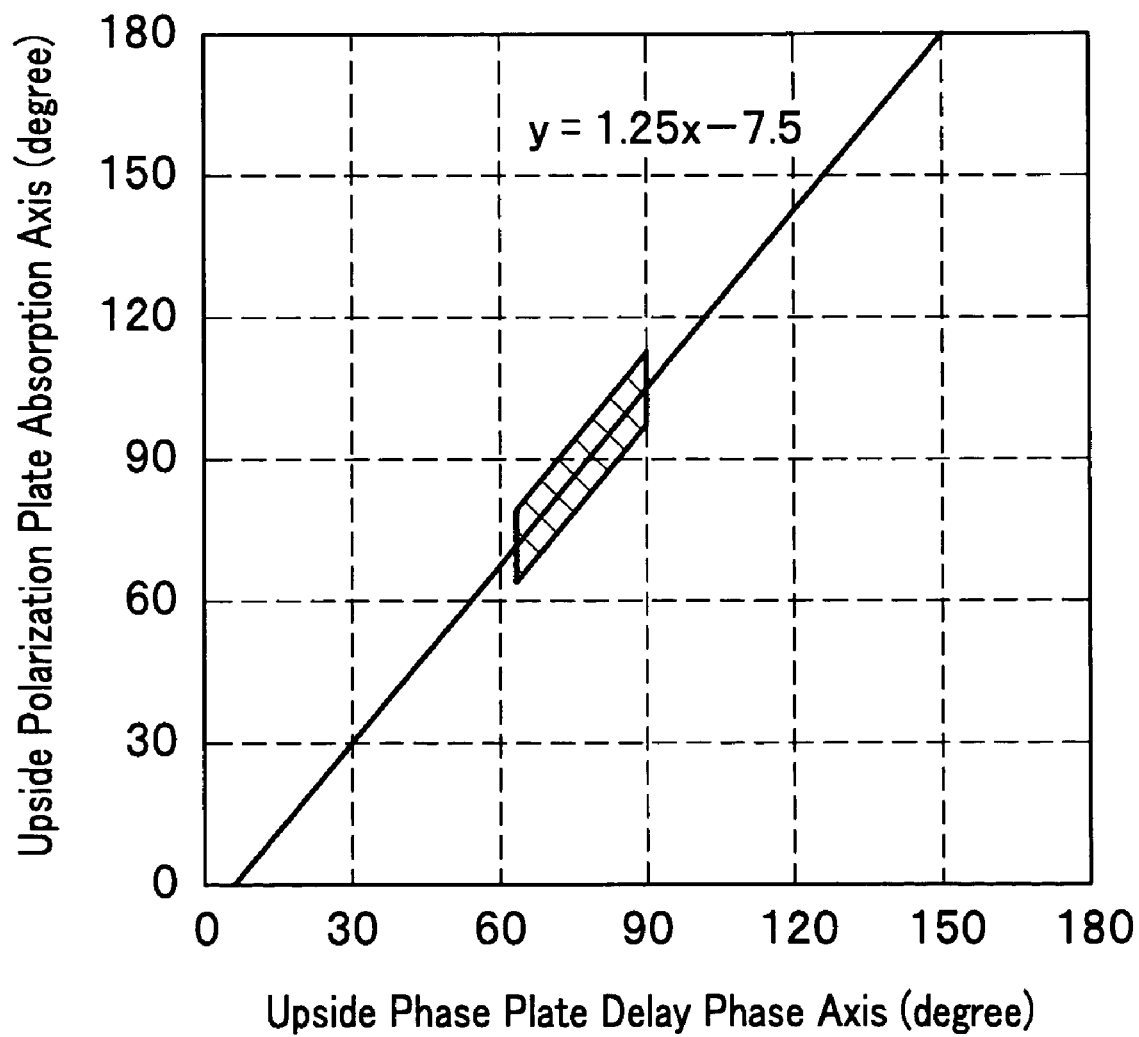
FIG. 3 is a drawing showing a combination of an upside phase plate delay phase axis and an upside polarization plate absorption axis giving a favorable contrast ratio.

A lateral axis of FIG. 3 is the delay phase axis of the upside phase plate and the longitudinal axis is the absorption axis of the upside polarization plate. An area giving favorable contrast ratios linearly distributes in FIG. 3, and making the delay phase axis x and the absorption axis y, the area distributes approximately centering on a line: y=1.25x−7.5. The delay phase axis of the upside phase plate distributes within the range of not less than 62 degrees and not more than 90 degrees, and the absorption axis of the upside polarization plate distributes within the range of ±8 degrees centering on the line.

Figure 4:
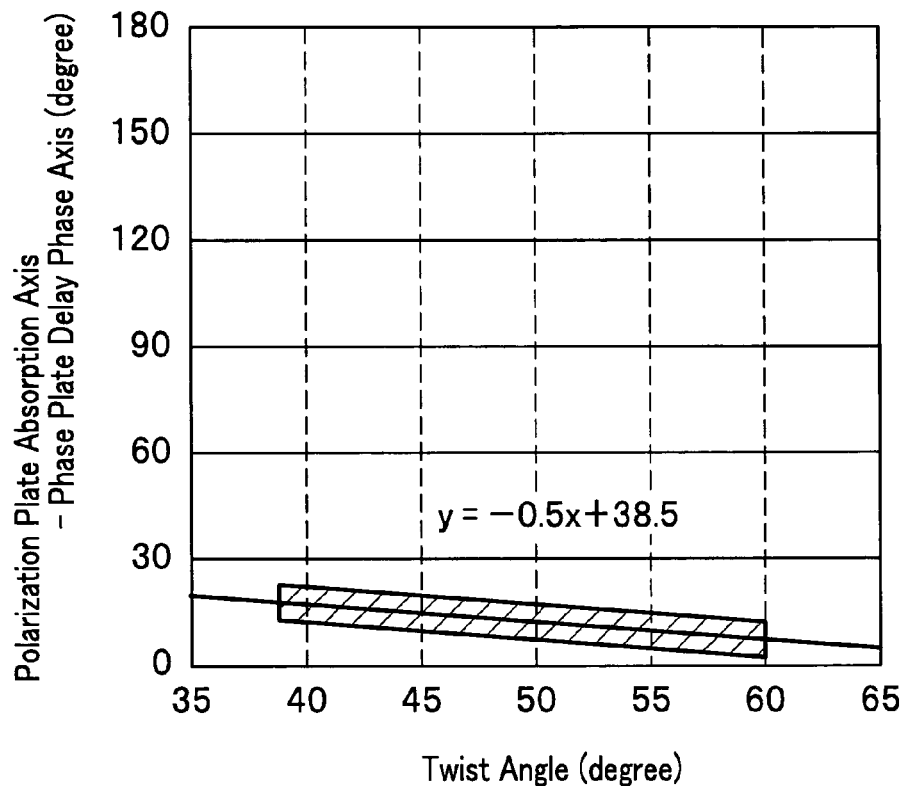
FIG. 4 is a drawing showing a combination of a twist angle and an absorption axisl azimuthal angle of an upside polarization plate minus a delay phase axis azimuthal angle of an upside phase plate giving a favorable contrast ratio.

A lateral axis of FIG. 4 is the twist angle and the longitudinal axis is a value where delay phase axis azimuthal angles of the upside phase plate are subtracted from an absorption axis azimuthal angles of the upside polarization plate. The absorption axis azimuthal angles of the upside polarization plate minus the delay phase axis azimuthal angles of the upside phase plate are always positive values, whereby the upside polarization plate absorption axis is shown to be always in a counterclockwise direction for the upside phase plate delay phase axis. Making the lateral axis x and the longitudinal axis y, an area giving favorable contrast ratios distributes approximately centering on a line: y=−0.5x+38.5. The twist angles distribute within the range of not less than 38 degrees and not more than 60 degrees, and the absorption axis azimuthal angles of the upside polarization plate minus the delay phase axis azimuthal angles of the upside phase plate distribute within the range of ±5 degrees centering on the line.

Figure 5:
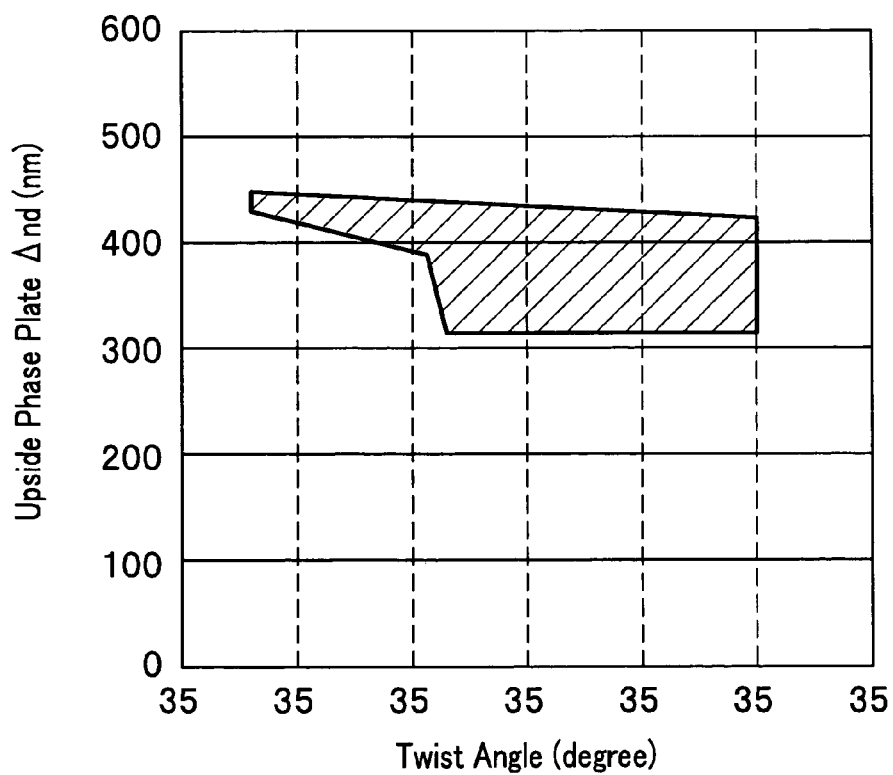
FIG. 5 is a drawing showing a combination of a twist angle and Δnd of an upside phase plate giving a favorable contrast ratio.

A lateral axis of FIG. 5 is the twist angle and longitudinal axis is the Δnd of the upside phase plate. In FIG. 5 an area giving favorable contrast ratios distributes on a polygon consisting of apexes of six points: (twist angle, upside phase plate Δnd)=(60 degrees, 320 nm), (60 degrees, 415 nm), (38 degrees, 475 nm), (38 degrees, 470 nm), (46 degrees, 395 nm), and (47 degrees, 320 nm).

Figure 6:
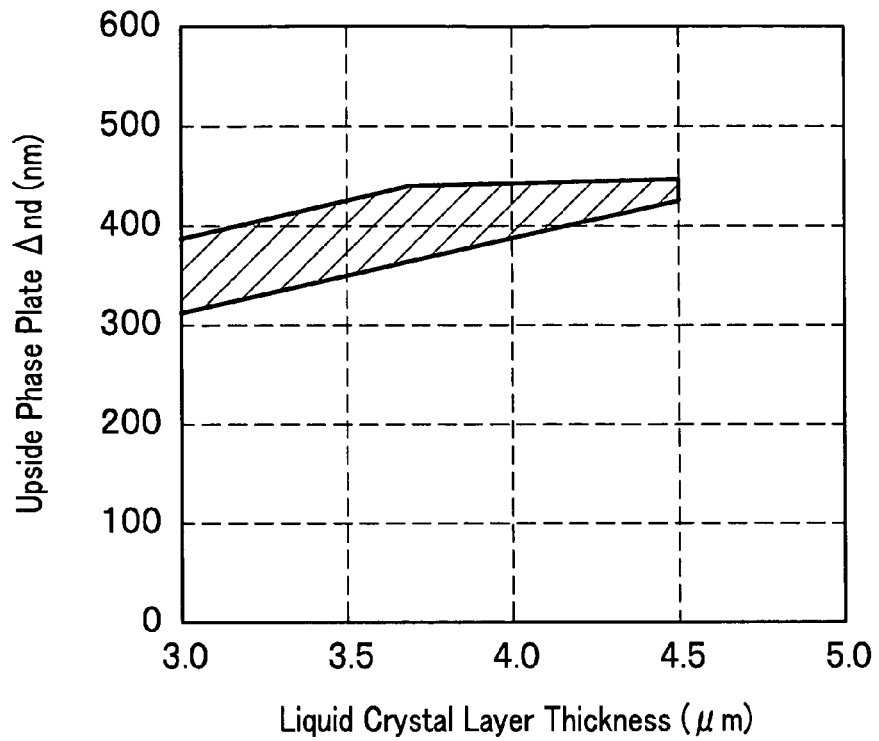
FIG. 6 is a drawing showing a combination of a liquid crystal layer thickness and Δnd of an upside phase plate giving a favorable contrast ratio.

A lateral axis of FIG. 6 is the liquid crystal layer thickness and the longitudinal axis is the Δnd of the upside phase plate. The lateral axis of FIG. 6 like the longitudinal axis of FIG. 2 can be converted to the Δnd of the liquid crystal layer by being multiplied by 0.072. In FIG. 6 an area giving favorable contrast ratios distributes on a polygon consisting of apexes of five points: (liquid crystal layer thickness, upside phase plate Δnd)=(3.0 μm, 320 nm), (4.5 μm, 420 nm), (4.5 μm, 425 nm), (3.6 μm, 410 nm), and (3.0 μm, 385 nm).

Accordingly, by setting the range of the liquid crystal layer thicknesses not less than 3.0 μm and not more than 4.5 μm, and/or the Δnd of the liquid crystal layer not less than 0.216 μm and not more than 0.324 μm, the twist angles of the liquid crystal layer not less than 37 degrees and not more than 60 degrees, the Δnd of the upside phase plate not less than 315 nm and not more than 455 nm, the delay phase axis azimuthal angles of the upside phase plate not less than 62 degrees and not more than 90 degrees, the absorption axis azimuthal angles of the upside polarization plate not less than 68 degrees and not more than 107 degrees, and the values of the absorption axis azimuthal angles of the upside polarization plate minus the delay phase axis azimuthal angles of the upside phase plate not less than 7 degrees and not more than 18 degrees; and selecting a combination of each parameter satisfying a solution within theses ranges, the reflective display of the normally closed type is obtained in the configuration using one upside phase plate.

Embodiment 6

Figure 7:
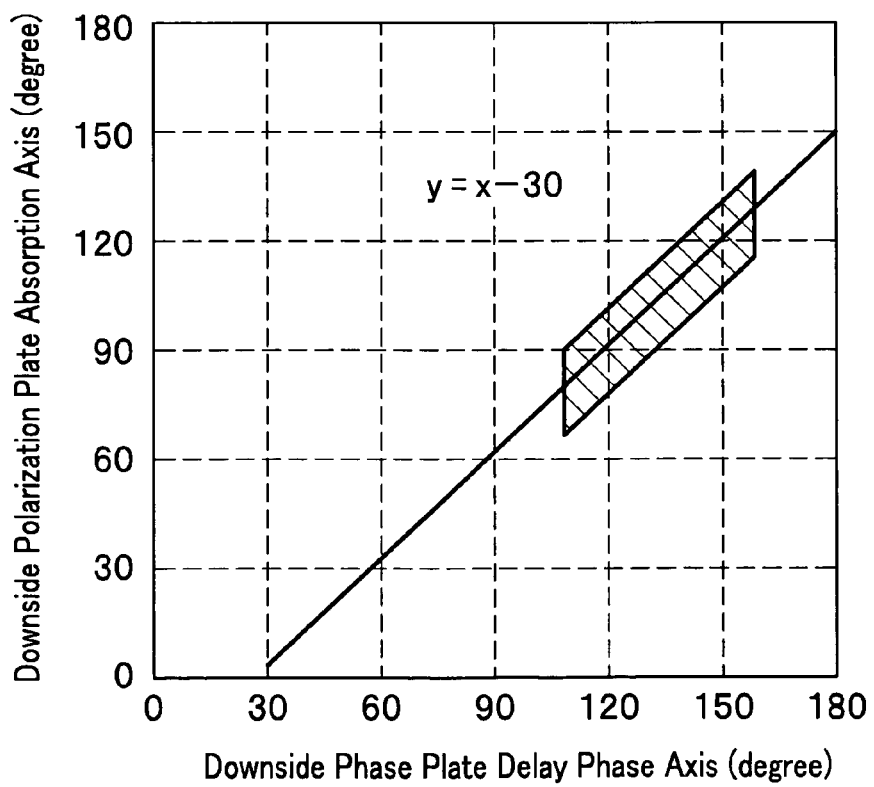
FIG. 7 is a drawing showing a combination of a downside phase plate delay phase axis and a downside polarization absorption axis giving a favorable contrast ratio of a transmissive display.
Figure 8:
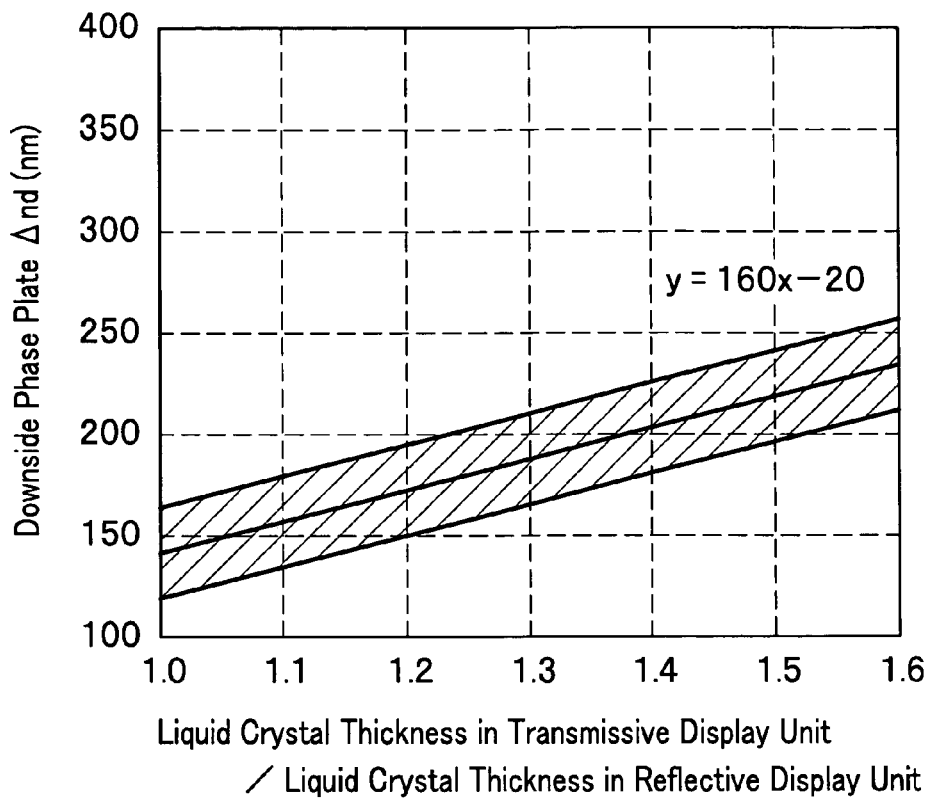
FIG. 8 is a drawing showing a retardation value of a downside phase plate giving a transmissive display of a favorable contrast ratio in each value of a ratio of liquid crystal layer thicknesses of a transmissive display unit and a reflective display unit.

The embodiment tries, in making the reflective display the normally closed type, to widely obtain the delay phase axis azimuthal angle of the downside phase plate, the retardation of the downside phase plate, and the absorption axis azimuthal angle of the downside polarization plate that likewise make the transmissive display the normally closed type. Preparing many devices variously changed in step differences between the reflective display unit and transmissive display unit in the liquid crystal display device of the embodiment 1, measure a polarization state of lights transmitting the upside polarization plate, upside phase plate, and the liquid crystal layer of the transmissive display unit in no voltage application with each wavelength of the visible light areas. If converting the lights so that they become same linear polarized lights across a wide range of the visible light areas and disposing the downside phase plate so that its absorption axis becomes parallel to the vibration direction of the polarized lights, the transmissivity of the dark display can be reduced and the transmissive display can be made the normally closed type like the reflective display. Obtain the retardation and delay phase axis azimuthal angle of the downside phase plate and the absorption axis azimuthal angle of the downside polarization plate satisfying the above. These results are shown in FIG. 7 and FIG. 8. In FIGS. 7 and 8 the distribution areas of the optical parameters giving favorable contrast ratios are shown with oblique lines.

A longitudinal axis of FIG. 7 is the absorption axis azimuthal angle of the downside polarization plate and the lateral axis is the delay phase axis azimuthal angle of the downside phase plate. Making the longitudinal axis y and the lateral axis x, an area giving favorable contrast ratios in FIG. 7 distributes centering on a line: y=x−30. The delay phase axis azimuthal angles of the downside phase plate distribute within the range of not less than 110 degrees and not more than 160 degrees, and the absorption axis azimuthal angles of the downside polarization plate distribute within the range of ±10 degrees centering on the line.

A longitudinal axis of FIG. 8 is the retardation of the downside phase plate and the lateral axis is the ratio of the liquid crystal layer thicknesses of the transmissive display unit and reflective display unit. Making the longitudinal axis y and the lateral axis x, an area giving favorable contrast ratios in FIG. 8 distributes centering on a line: y=160x−20. The ratios of the liquid crystal layer thicknesses of the transmissive display unit and reflective display unit distribute within the range of not less than 1.1 and not more than 1.6 and the retardations of the downside phase plate distribute within the range of ±20 nm centering on the line.

By setting the Δnd of the downside phase plate within the range of not less than 120 nm and not more than 256 nm, the delay phase axis azimuthal angles of the downside phase plate within the range of not less than 110 degrees and not more than 160 degrees, the absorption axis azimuthal angles of the upside polarization plate within the range of not less than 70 degrees and not more than 140 degrees; and selecting a combination of each parameter satisfying a solution within theses ranges, the transmissive display of the normally closed type as well as the reflective display of the normally closed type are obtained.

Since the retardation of the liquid crystal layer in the dark display in the normally open type is an extremely small value, the retardations of the upside phase plate and downside phase plate must be made values close to ¼ wavelengths as described before. However, it is impossible to make the retardations close to the ¼ wavelengths in all areas of the visible wavelengths using only one phase plate, so this is usually realized by stacking a ¼ wavelength plate and ½ wavelength plate. Accordingly, the normally open type needs four phase plates totaling the upside and downside.

On the other hand, the normally closed type can make the retardations of the stacked layer body of one upside phase plate and liquid crystal layer values close to the ¼ wavelengths in all areas of the visible wavelengths utilizing the retardation which the liquid crystal layer has. The transmissive display can also improve the contrast ratio of the transmissive display with using only one downside phase plate by utilizing the characteristics of a wavelength dispersion of transmissive lights. Since a number of phase plates is thus a few, one in the upside and one in the downside, it is one of advantages of the normally closed type for the normally open type that the thickness of a total display can be thinned and its cost is also low.

Embodiment 7

The embodiment obtains in more detail step differences between the reflective display unit and transmissive display unit giving a favorable display by using a sensory evaluation. For the display, it focuses attention particularly on a gradation and contrast ratio of the transmissive display and a flicker.

If a shape of a curve of the transmissivity versus the applied voltage and that of a curve of the reflectivity versus the applied voltage are approximately same, both of the reflective display and transmissive display can obtain a favorable gradation display in a same gradation voltage setting condition. As shown in the embodiment 4, the shape of the curve of the transmissivity versus the applied voltage is decided by the step differences between the reflective display unit and transmissive display unit. In addition, the step differences between the reflective display unit and transmissive display unit are mainly decided by a thickness of the second insulation layer.

Moreover, the thickness of the second insulation layer decides distances between the signal wiring and reflective electrode, and the scan wiring and reflective electrode. The reflective electrode distributes so as to overlap the signal wiring and scan wiring in order to improve an open area ratio, and at this time, parasitic capacitances occur between the signal wiring and reflective electrode, and the scan wiring and reflective electrode. If the parasitic capacitances are large, the reflectivity and transmissivity cannot be kept constant within a hold time with being influenced by a plunge voltage, thereby a flicker phenomenon where a screen is seen flickered occurring. Sufficiently thickening the second insulation layer enables the flicker to be prevented since the parasitic capacitances can be reduced.

In the liquid crystal display device of the embodiment 1, seven kinds of transflective liquid crystal display devices that are different in step differences between reflective display units and transmissive display units are made with the thicknesses of second insulation layers variously being changed. The step differences between the reflective display units and transmissive display units are respectively made: (a) 0.5 μm, (b) 0.8 μm, (c) 1.3 μm, (d) 1.5 μm, (e) 1.7 μm, (f) 2.0 μm, and (g) 2.5 μm. Although a curve of the reflectivity versus the applied voltage is same in each liquid crystal display device, a shape of the curve of the transmissivity versus the applied voltage is different each other.

The gradation voltage of each liquid crystal display device, where the reflective display only is observed in a backlight light unlit state, is set in accordance with the reflective display. When the shape of the curve of the transmissivity versus the applied voltage becomes larger compared with that of the curve of the reflectivity versus the applied voltage, the gradation of the transmissive display is degraded. Particularly, when an initial rise of the curve of the transmissivity versus the applied voltage is gradual compared with that of the curve of the reflectivity versus the applied voltage, the gradation of the transmissive display slants to a black display, thereby the transmissive display resulting in being observed to be blackly crushed. Arbitrary selecting nine observers and making them observe the display state of each liquid crystal display device in a room with an illumination light while lighting a backlight light, evaluate degrees of the flicker, and the gradation of the display by the sensory evaluation. At this time the observers simultaneously observe the reflective display and transmissive display. In addition, some observers observe the liquid crystal display device while shaking it in order to observe the degrees of the flicker in more detail.

The degrees of the flicker are evaluated in four levels: (i) the flicker is not perceived; (ii) the flicker is perceived, however it does not get on nerves, (iii) the flicker gets on nerves; and (iv) the display is unusable. Similarly the gradations are evaluated in four levels: (i) the degradation of the gradation is not perceived; (ii) the degradation of the gradation is perceived, however it does not get on nerves; (iii) the degradation of the gradation gets on nerves; and (iv) the display is unusable.

By giving (i), (ii), (iii), and (iv) 0 point, 1 point, 2 points, and 3 points, respectively, and averaging the evaluations of the observers, an observation result is made qualitative. The evaluation result of each liquid crystal display device is summarized as in table 1.

TABLE 1

| Step difference of Reflective Display Unit minus Transmissive Display Unit (μm) | Observers' Evaluation Point | |
|---|---|---|
| | Gradation | Flicker |
| 0.5 | 1.44 | 1.54 |
| 0.8 | 0.96 | 0.97 |
| 1.3 | 0.75 | 0.78 |
| 1.5 | 0.65 | 0.79 |
| 1.7 | 0.65 | 0.69 |
| 2.0 | 0.65 | 0.71 |
| 2.5 | 0.75 | 0.75 |

If the evaluation is (i) and (ii), the display is usable. Converted to the evaluation point, not more than 1 is usable. Seeing Table 1, the evaluation point not more than 1 is obtained in the liquid crystal display devices (b), (c), (d), (e), (f), and (g). From the above sensory evaluation is obtained a result that making the step difference between the reflective display unit and transmissive display unit not less than 0.8 μm gives a favorable display excellent in the gradation without the flicker.

Concerning the flicker, since degrees of its appearance are decided by the parasitic capacitances, the flicker depends on the step difference between the reflective display unit and transmissive display unit.

On the other hand, concerning the gradation it is decided by the difference between the shape of the curve of the transmissivity versus the applied voltage and that of the curve of the reflectivity versus the applied voltage, and the difference between the shapes depends on a light path difference between the reflective display unit and transmissive display unit. Therefore, for example, if the Δn of a liquid crystal material used for the liquid crystal layer is changed, an optimum step difference range becomes a different value from the presented value (not less than 0.8 μm) in the previous section. Since the light path difference is represented by the product of the Δn of the liquid crystal material and liquid crystal layer thickness, to represent a step difference range in a ratio of the liquid crystal layer thicknesses of the reflective display unit and transmissive display unit enables an influence of the Δn of the liquid crystal material to be erased. Represented by the ratio of liquid crystal layer thicknesses of the reflective display unit and transmissive display unit, the step difference range where the favorable evaluation is obtained becomes not less than 1.21. That is, making the ratio of liquid crystal layer thicknesses of the reflective display unit and transmissive display unit not less than 1.21 enables the favorable display that is excellent in the gradation to be obtained.

In addition, an upper limit value of the step difference of the reflective display unit and transmissive display unit is decided as follows: Using the rubbing method for the orientation processing of an orientation film, rub the orientation film while rotating a rubbing roller where a cloth is wound. Since when there exists a step difference between the reflective display unit and transmissive display unit, fibers of the rubbing roller cloth is not contacted till an end of the transmissive display unit, an orientation defect occurs in the end of the transmissive display unit. In the orientation defect portion the transmissivity of the dark display is not sufficiently lowered, thereby the contrast ratio being lowered.

Although the orientation defect of the end of the transmissive display unit can be solved by conditions such as a fiber length, material of the cloth, rotation speed of the rubbing roller, and sending speed of a substrate being optimized, and by the fibers of the cloth being made to go around the end of the transmissive display unit, then the reflective display unit results in being rubbed with a higher density. Accordingly, when the step difference between the reflective display unit and transmissive display unit is too large, the orientations of the reflective display unit and transmissive display unit cannot be consistent. In order to make the orientations of the reflective display unit and transmissive display unit consistent, the step difference between the reflective display unit and transmissive display unit must be reduced below a certain constant value. To be more precise, to make the step difference not more than 3.0 μm enables the orientations to be consistent.

Putting together the above and the step difference range obtained before giving a display excellent in the gradation without the flicker, an optimum step difference range becomes not less than 0.8 μm and not more than 3.0 μm. In addition, representing this in the ratios of the liquid crystal layer thicknesses of the transmissive display unit and reflective display unit, the ratios become not less than 1.21 and not more than 1.53.

Embodiment 8

In the liquid crystal display device of the embodiment 1, dispose the absorption axis azimuthal angle of the upside polarization plate and that of the downside polarization plate rotating them by 90 degrees, respectively. Also at this time the characteristics of the reflective display and transmissive display almost similar to those of the embodiment 1 are obtained.

Thus, also when the absorption axis azimuthal angle of the upside polarization plate and that of the downside polarization plate are simultaneously rotated by 90 degrees, the almost similar characteristics are obtained.

Embodiment 9

In the liquid crystal display device of the embodiment 1, enlarge the step difference between the reflective display unit and transmissive display unit to 2.0 μm. In addition, set the Δnd of the downside phase plate 250 nm, the delay phase axis azimuthal angle of the downside phase plate 110 degrees, and the absorption axis of the downside polarization plate 80 degrees.

In both of the reflective display and transmissive display, the display of the normally closed type is obtained. In addition, the reflectivity and transmissivity in the luminous display are 40% and 39%, respectively, and in both, values close to limit values due to the absorptions of the polarization plates are obtained.

Although the liquid crystal display device of the embodiment 1 has no problem in a daily used condition, some flicker is observed when the device is shook and moved while observed, and when a visual line is rapidly moved while the device is observed. The embodiment enlarges the step difference between the reflective display unit and transmissive display unit to 2.0 μm, increases the distances between the signal wiring and reflective electrode, and the scan wiring and reflective electrode, and further reduces the parasitic capacitances. Accordingly, the flicker can be reduced in a higher level. As a result, even under the above special use conditions the flicker becomes unobserved.

Embodiment 10

Figure 18:
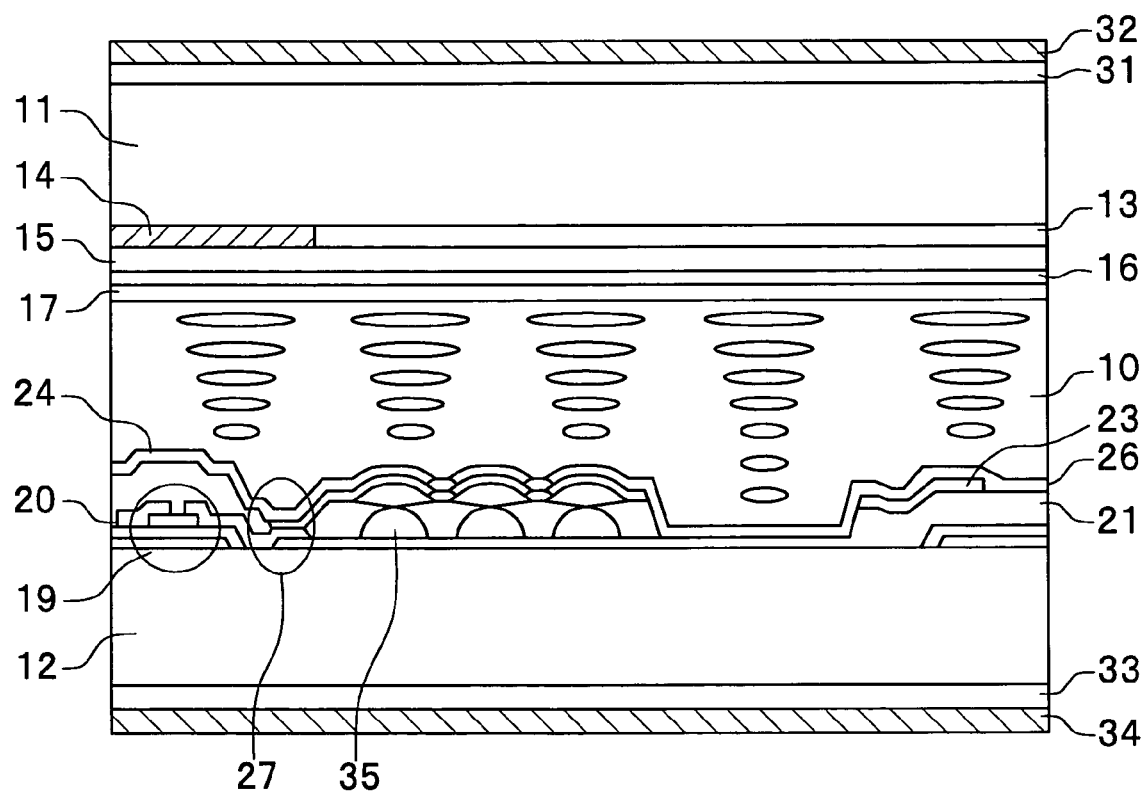
FIG. 18 is a section drawing showing a configuration of a liquid crystal display device of an embodiment 10.

In the liquid crystal display device of the embodiment 1, give the device a light diffusiveness forming a minuscule concavity and convexity on the reflective electrode. Show a section of a liquid crystal display device of the embodiment in FIG. 18. Form a concavity and convexity formed layer 35 under the second insulation film. The concavity and convexity formed layer is a convex shape, and make it a convexity having an approximately parabolic section by heating and thereby melting a cylindrically formed organic film. Also give the second insulation film the concavity and convexity by the concavity and convexity formed layer and further give a reflective electrode formed on its upper layer the concavity and convexity. In addition, although up to now stacking a diffusion adhesive between the upside phase plate and upside substrate in order to give the diffusiveness, use a normal adhesive without the diffusiveness by removing the diffusion adhesive.

Since in the embodiment 1 the diffusion adhesive and reflective electrode are separated by the upside substrate, a light diffusion and light reflection result in occurring in different positions. Although the embodiment 1 has no problem, there exists a possibility that a resolution lowering occurs due to a blur of an image if a pixel is more miniaturized than that of the embodiment 1. The embodiment gives the reflective electrode itself the diffusiveness, thereby there existing no possibility that the resolution lowering occurs even if the pixel is miniaturized.

Thus, the liquid crystal display devices of the invention and each the embodiment can obtain the reflective display and transmissive display of a higher efficiency, therefore, if the devices are mounted on a hand-held information appliance and the like, they can obtain an effect that their display characteristics are more improved under a wide range of luminous environments ranging from a dark place to direct sunlight.

For example, under the wide range of the luminous environments ranging from the dark place to direct sunlight, a more luminous display is obtained, and/or by a color filter of a higher color purity being mounted, a color display with a wider range of a color reproduction is obtained.

INDUSTRIAL APPLICABILITY

As described above, the present invention is useful for providing the liquid crystal display devices of a higher contrast ratio.

What is claimed is:

1. A liquid crystal display device having a first substrate, a second substrate, a liquid crystal layer pinched between said first substrate and said second substrate, and a driving unit, wherein a characteristic of a reflectivity versus an applied voltage is a normally closed type and a characteristic of a transmissivity versus an applied voltage is the normally closed type:
   wherein said first substrate has a common electrode, and an upside polarization plate and an upside phase plate on an upper surface;
   wherein said second substrate has a reflective electrode and a transparent electrode connected with an active element, and a downside polarization plate and a downside phase plate on a lower surface;
   wherein said liquid crystal layer has a twist angle not less than 40 degrees and not more than 65 degrees;
   wherein a retardation of the liquid crystal layer in a reflective display unit is within a range of not less than 230 nm and not more than 300 nm; and
   wherein a retardation of the liquid crystal layer in a transmissive display unit is larger than the retardation of the liquid crystal layer in the reflective display unit,
   wherein the twist angle and $\Delta$nd of said liquid crystal layer are included within a polygon of which apexes, in a graph of which lateral axis is the twist angle of the liquid crystal layer and of which longitudinal axis is the $\Delta$nd, consist of six points: (twist angle of the liquid crystal layer, retardation $\Delta$nd of the liquid crystal layer)=(47 degrees, 216 nm), (60 degrees, 216 nm), (60 degrees, 259 nm), (42 degrees, 324 nm), (39 degrees, 324 nm), and (47 degrees, 252 nm).

2. A liquid crystal display device having a first substrate, a second substrate, a liquid crystal layer pinched between said first substrate and said second substrate, and a driving unit, wherein a characteristic of a reflectivity versus an applied voltage is a normally closed type and a characteristic of a transmissivity versus an applied voltage is the normally closed type:
   wherein said first substrate has a common electrode, and an upside polarization plate and an upside phase plate on an upper surface;
   wherein said second substrate has a reflective electrode and a transparent electrode connected with an active element, and a downside polarization plate and a downside phase plate on a lower surface;
   wherein said liquid crystal layer has a twist angle not less than 40 degrees and not more than 65 degrees;
   wherein a retardation of the liquid crystal layer in a reflective display unit is within a range of not less than 230 nm and not more than 300 nm; and
   wherein a retardation of the liquid crystal layer in a transmissive display unit is larger than the retardation of the liquid crystal layer in the reflective display unit,
   wherein when a lateral axis is made x and a longitudinal axis is made y in a graph where said lateral axis is made the delay phase axis azimuthal angle of said upside phase plate and the longitudinal axis is made the absorption axis azimuthal angle of said upside polarization plate, the delay phase axis azimuthal angle of said upside phase plate and the absorption axis azimuthal angle of said upside polarization plate distribute approximately centering on a line: $y=1.25x-7.5$, wherein the delay phase axis azimuthal angle of said upside phase plate distributes within a range of not less than 62 degrees and not more than 90 degrees, and wherein the absorption axis azimuthal angle of said upside polarization plate distributes within a range of 8 degrees centering on said line.

3. A liquid crystal display device having a first substrate, a second substrate, a liquid crystal layer pinched between said first substrate and said second substrate, and a driving unit, wherein a characteristic of a reflectivity versus an applied voltage is a normally closed type and a characteristic of a transmissivity versus an applied voltage is the normally closed type:
   wherein said first substrate has a common electrode, and an upside polarization plate and an upside phase plate on an upper surface;
   wherein said second substrate has a reflective electrode and a transparent electrode connected with an active element, and a downside polarization plate and a downside phase plate on a lower surface;
   wherein said liquid crystal layer has a twist angle not less than 40 degrees and not more than 65 degrees;
   wherein a retardation of the liquid crystal layer in a reflective display unit is within a range of not less than 230 nm and not more than 300 nm; and
   wherein a retardation of the liquid crystal layer in a transmissive display unit is larger than the retardation of the liquid crystal layer in the reflective display unit,
   wherein when a lateral axis is made x and a longitudinal axis is made y in a graph where the longitudinal axis is made the absorption axis azimuthal angle of said upside polarization plate minus the delay phase axis azimuthal angle of said upside phase plate and the lateral axis is made the twist angle of said liquid crystal layer, the twist angle of said liquid crystal layer and a value where the delay phase axis azimuthal angle of said upside phase plate is subtracted from the absorption axis azimuthal angle of said upside polarization plate distributes approximately centering on a line: $y=-0.5x+38.5$; and wherein the twist angle distributes within a range of not less than 38 degrees and not more than 60 degrees, and the absorption axis azimuthal angle of the upside polarization plate minus the delay phase axis azimuthal angle of the upside phase plate distributes within a range of ±5 degrees centering on said line.

4. A liquid crystal display device having a first substrate, a second substrate, a liquid crystal layer pinched between said first substrate and said second substrate, and a driving unit, wherein a characteristic of a reflectivity versus an applied voltage is a normally closed type and a characteristic of a transmissivity versus an applied voltage is the normally closed type:

wherein said first substrate has a common electrode, and an upside polarization plate and an upside phase plate on an upper surface;

wherein said second substrate has a reflective electrode and a transparent electrode connected with an active element, and a downside polarization plate and a downside phase plate on a lower surface;

wherein said liquid crystal layer has a twist angle not less than 40 degrees and not more than 65 degrees;

wherein a retardation of the liquid crystal layer in a reflective display unit is within a range of not less than 230 nm and not more than 300 nm; and wherein a retardation of the liquid crystal layer in a transmissive display unit is larger than the retardation of the liquid crystal layer in the reflective display unit, wherein in a graph where a longitudinal axis is made the $\Delta nd$ of said upside phase plate and a lateral axis is made the twist angle of said liquid crystal layer, the twist angle of the liquid crystal layer and the $\Delta nd$ of the upside phase plate are included within a polygon consisting of apexes of six points: (twist angle, upside phase plate $\Delta nd$)=(60 degrees, 320 nm), (60 degrees, 415 nm), (38 degrees, 475 nm), (38 degrees, 470 nm), (46 degrees, 395 nm), and (47 degrees, 320 nm).

5. A liquid crystal display device having a first substrate, a second substrate, a liquid crystal layer pinched between said first substrate and said second substrate, and a driving unit, wherein a characteristic of a reflectivity versus an applied voltage is a normally closed type and a characteristic of a transmissivity versus an applied voltage is the normally closed type:

wherein said first substrate has a common electrode, and an upside polarization plate and an upside phase plate on an upper surface;

wherein said second substrate has a reflective electrode and a transparent electrode connected with an active element, and a downside polarization plate and a downside phase plate on a lower surface;

wherein said liquid crystal layer has a twist angle not less than 40 degrees and not more than 65 degrees;

wherein a retardation of the liquid crystal layer in a reflective display unit is within a range of not less than 230 nm and not more than 300 nm; and wherein a retardation of the liquid crystal layer in a transmissive display unit is larger than the retardation of the liquid crystal layer in the reflective display unit, wherein in a graph where the lateral axis is made $\Delta nd$ of said liquid crystal layer and the longitudinal axis is made $\Delta nd$ of said upside phase plate, a retardation of the liquid crystal layer and the $\Delta nd$ of the upside phase plate are included within a polygon consisting of apexes of five points: (liquid crystal layer $\Delta nd$, upside phase plate $\Delta nd$)=(216 nm, 320 nm), (324 nm, 420 nm), (324 nm, 425 nm), (259 nm, 410 nm), and (216 nm, 385 nm).

6. A transflective liquid crystal display device having a first substrate, a second substrate, and a liquid crystal layer pinched between said first substrate and said second substrate, wherein a display unit has a reflective display unit reflecting a light entered from the first substrate that is an upper surface and a transmissive display unit transmitting a light entered from the second substrate that is a lower surface:

wherein a characteristic of a reflectivity versus an applied voltage of the liquid crystal display device is a normally closed type, and a characteristic of a transmissivity versus an applied voltage of the liquid crystal display device is also the normally closed type;

wherein said first substrate has a common electrode, and an upside polarization plate and an upside phase plate on an upper surface;

wherein said second substrate has a reflective electrode, a transparent electrode, and a downside polarization plate and a downside phase plate on a lower surface;

wherein said liquid crystal layer has a twist angle not less than 40 degrees and not more than 65 degrees;

wherein a retardation of the liquid crystal layer in said reflective display unit is within a range of not less than 230 nm and not more than 300 nm; and wherein a retardation of the liquid crystal layer in said transmissive display unit is larger than the retardation of the liquid crystal layer in the reflective display unit, wherein in a graph where a lateral axis is made the twist angle of said liquid crystal layer and a longitudinal axis is made $\Delta nd$, the $\Delta nd$ and twist angle of said liquid crystal layer are included within a polygon consisting of apexes of six points: (twist angle of liquid crystal, retardation $\Delta nd$ of liquid crystal)=(47 degrees, 216 nm), (60 degrees, 216 nm), (60 degrees, 259 nm), (42 degrees, 324 nm), (39 degrees, 324 nm), and (47 degrees, 252 nm).

* * * * *